United States Patent
Raghavan et al.

(10) Patent No.: US 12,531,626 B2
(45) Date of Patent: Jan. 20, 2026

(54) ASYMMETRIC UPLINK-DOWNLINK BEAM TRAINING IN FREQUENCY BANDS

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/156,774

(22) Filed: Jan. 25, 2021

(65) Prior Publication Data

US 2021/0234597 A1 Jul. 29, 2021

Related U.S. Application Data

(60) Provisional application No. 62/966,506, filed on Jan. 27, 2020.

(51) Int. Cl.
  *H04B 7/06* (2006.01)
  *H01Q 21/24* (2006.01)
  *H04B 7/0456* (2017.01)

(52) U.S. Cl.
  CPC ......... *H04B 7/06966* (2023.05); *H01Q 21/24* (2013.01); *H04B 7/0456* (2013.01); *H04B 7/0617* (2013.01); *H04B 7/0634* (2013.01)

(58) Field of Classification Search
  CPC .. H04B 7/0634; H04B 7/0456; H04B 7/0617; H01Q 21/24
  See application file for complete search history.

(56) References Cited

U.S. PATENT DOCUMENTS

| | | | | |
|---|---|---|---|---|
| 6,002,360 A | * | 12/1999 | Wolcott | H01Q 1/288 455/13.1 |
| 7,787,554 B1 | * | 8/2010 | Nabar | H04B 7/0874 375/267 |

(Continued)

FOREIGN PATENT DOCUMENTS

| | | | | |
|---|---|---|---|---|
| CN | 1761182 A | * | 4/2006 | H04L 5/0007 |
| CN | 201902262 U | * | 7/2011 | F01L 1/344 |

(Continued)

OTHER PUBLICATIONS

Y. Du, J. Tong, J. Zhang and S. Liu, "Evaluation of PMI Feedback Schemes for MU-MIMO Pairing," in IEEE Systems Journal, vol. 4, No. 4, pp. 505-510, Dec. 2010, doi: 10.1109/JSYST.2010.2082111. (Year: 2010).*

(Continued)

*Primary Examiner* — Berhanu Tadese
(74) *Attorney, Agent, or Firm* — Holland & Hart LLP/QUALCOMM Incorporated

(57) ABSTRACT

Methods, systems, and devices for wireless communications are described. A first wireless device may identify a collective antenna array that includes both a downlink antenna array and an uplink antenna array for communications with a second wireless device. Accordingly, the first wireless device and the second wireless device may perform a beam training procedure on the collective antenna array, and the first wireless device may then use beam weights identified for the collective antenna array as the beam weights for the specific downlink antenna array and the uplink antenna array. For example, the first wireless device and the second wireless device may perform downlink beam training to obtain a best downlink receive beam to use and then determine an uplink transmit beam to use based on the downlink receive beam.

50 Claims, 20 Drawing Sheets

(56) References Cited

U.S. PATENT DOCUMENTS

| | | | | |
|---|---|---|---|---|
| 7,826,415 B2* | 11/2010 | Oh | H04W 72/51 | 455/450 |
| 8,503,322 B2* | 8/2013 | Krishnamurthy | H04L 27/2647 | 370/252 |
| 8,953,704 B2* | 2/2015 | Yu | H04B 7/10 | 375/267 |
| 9,312,933 B2* | 4/2016 | Zhang | H04B 7/063 | |
| 9,363,683 B2* | 6/2016 | Raghavan | H04B 7/0851 | |
| 9,509,382 B1* | 11/2016 | Nabar | H04B 7/0408 | |
| 9,520,973 B2* | 12/2016 | Kim | H04B 7/0891 | |
| 9,780,928 B2 | 10/2017 | Moshfeghi | | |
| 9,806,777 B1* | 10/2017 | Doostnejad | H04B 7/0617 | |
| 9,853,702 B1* | 12/2017 | Liang | H04B 7/0456 | |
| 10,004,032 B2* | 6/2018 | Islam | H04W 28/26 | |
| 10,075,223 B1* | 9/2018 | Pawar | H04L 5/0044 | |
| 10,425,878 B2* | 9/2019 | Cezanne | H04B 7/06958 | |
| 10,425,901 B2* | 9/2019 | Islam | H04W 52/242 | |
| 10,462,796 B2* | 10/2019 | Frenne | H04L 5/0048 | |
| 10,559,880 B1 | 2/2020 | Garrett et al. | | |
| 10,574,321 B2* | 2/2020 | Nilsson | H04B 7/0695 | |
| 10,826,585 B2* | 11/2020 | Bolotin | H04W 72/0446 | |
| 10,841,914 B2* | 11/2020 | Liou | H04L 5/0094 | |
| 10,879,627 B1* | 12/2020 | Frigon | H01Q 21/08 | |
| 10,924,173 B2* | 2/2021 | Bai | H04W 76/19 | |
| 10,986,235 B2* | 4/2021 | Seo | H04M 9/082 | |
| 11,145,331 B1* | 10/2021 | Nangare | G11B 20/10046 | |
| 11,438,877 B2* | 9/2022 | Luo | H04B 17/318 | |
| 12,284,059 B1* | 4/2025 | Nangare | H04L 25/03878 | |
| 2006/0008275 A1* | 1/2006 | Lacovara | H04B 13/00 | 398/140 |
| 2007/0070927 A1* | 3/2007 | Shoki | H04B 7/0417 | 370/310 |
| 2008/0240208 A1* | 10/2008 | Lou | H04B 7/0671 | 375/211 |
| 2011/0069633 A1* | 3/2011 | Schmidt | H04L 25/03343 | 343/893 |
| 2011/0255434 A1 | 10/2011 | Ylitalo | | |
| 2011/0261894 A1* | 10/2011 | Yu | H04B 7/0469 | 375/267 |
| 2012/0015603 A1* | 1/2012 | Proctor, Jr. | H01Q 21/28 | 455/11.1 |
| 2012/0064841 A1* | 3/2012 | Husted | H04B 7/086 | 455/78 |
| 2012/0140658 A1* | 6/2012 | Kanzaki | H04B 17/24 | 370/252 |
| 2014/0011468 A1* | 1/2014 | Park | H04B 7/0874 | 455/272 |
| 2014/0206304 A1* | 7/2014 | Zhang | H04B 7/0617 | 455/125 |
| 2014/0219381 A1* | 8/2014 | Yu | H04B 7/0691 | 375/267 |
| 2014/0235287 A1* | 8/2014 | Maltsev | H04B 7/0617 | 455/522 |
| 2014/0294111 A1* | 10/2014 | Zhang | H04W 52/241 | 375/267 |
| 2014/0363166 A1* | 12/2014 | Lacovara | G01V 1/226 | 398/104 |
| 2015/0092621 A1* | 4/2015 | Jalloul | H04L 5/1461 | 370/278 |
| 2015/0349863 A1* | 12/2015 | El Ayach | H04B 7/0408 | 375/295 |
| 2016/0020876 A1* | 1/2016 | Raghavan | H04L 5/006 | 370/252 |
| 2016/0021548 A1* | 1/2016 | Raghavan | H04B 7/046 | 370/329 |
| 2016/0044517 A1* | 2/2016 | Raghavan | H04B 7/0617 | 370/329 |
| 2016/0112173 A1* | 4/2016 | Wang | H04L 5/0048 | 370/329 |
| 2016/0241317 A1* | 8/2016 | Piazzi | H01Q 3/26 | |
| 2016/0242182 A1* | 8/2016 | Chen | H04W 76/15 | |
| 2017/0005958 A1* | 1/2017 | Frenkel | G01S 5/0242 | |
| 2017/0013630 A1* | 1/2017 | Franz | H04W 72/542 | |
| 2017/0117947 A1* | 4/2017 | Petersson | H04B 7/0617 | |
| 2017/0164226 A1* | 6/2017 | Wei | H04L 5/0028 | |
| 2017/0194706 A1* | 7/2017 | Lee | H04B 7/0619 | |
| 2017/0195998 A1* | 7/2017 | Zhang | H04B 7/06952 | |
| 2017/0294926 A1 | 10/2017 | Islam et al. | | |
| 2017/0359826 A1* | 12/2017 | Islam | H04B 7/06956 | |
| 2017/0364819 A1* | 12/2017 | Yang | H04L 41/16 | |
| 2018/0062720 A1* | 3/2018 | Islam | H04L 5/0053 | |
| 2018/0063693 A1* | 3/2018 | Chakraborty | H04W 8/005 | |
| 2018/0138962 A1* | 5/2018 | Islam | H04L 5/0032 | |
| 2018/0199258 A1* | 7/2018 | Cezanne | H04B 7/0413 | |
| 2018/0227094 A1 | 8/2018 | Liu et al. | | |
| 2018/0227772 A1 | 8/2018 | Yu et al. | | |
| 2018/0249453 A1* | 8/2018 | Nagaraja | H04B 7/0632 | |
| 2018/0249526 A1 | 8/2018 | Nagaraja et al. | | |
| 2018/0278309 A1* | 9/2018 | Raghavan | H04W 72/23 | |
| 2018/0278316 A1 | 9/2018 | Yang et al. | | |
| 2018/0278320 A1 | 9/2018 | Chendamarai et al. | | |
| 2019/0044596 A1* | 2/2019 | Bolotin | H04B 7/0617 | |
| 2019/0053220 A1* | 2/2019 | Zhang | H04W 72/21 | |
| 2019/0059056 A1 | 2/2019 | Islam et al. | | |
| 2019/0069198 A1* | 2/2019 | Gheorghiu | H04W 72/0453 | |
| 2019/0081691 A1* | 3/2019 | Nagaraja | H04L 1/0026 | |
| 2019/0081753 A1* | 3/2019 | Jung | H04B 7/0695 | |
| 2019/0103908 A1 | 4/2019 | Yu et al. | | |
| 2019/0141552 A1* | 5/2019 | Chen | H04B 7/06964 | |
| 2019/0150161 A1* | 5/2019 | Cheng | H04W 76/27 | 370/330 |
| 2019/0174385 A1* | 6/2019 | Sang | H04W 40/16 | |
| 2019/0190582 A1* | 6/2019 | Guo | H04B 17/327 | |
| 2019/0239092 A1 | 8/2019 | Zhou et al. | | |
| 2019/0268118 A1* | 8/2019 | Sadiq | H04W 74/0833 | |
| 2019/0349058 A1* | 11/2019 | Raghavan | H04B 7/0808 | |
| 2019/0349863 A1* | 11/2019 | Lim | H04W 52/42 | |
| 2019/0393948 A1* | 12/2019 | Zhao | H04B 7/0408 | |
| 2019/0394339 A1* | 12/2019 | Seo | H04R 1/1083 | |
| 2020/0015106 A1 | 1/2020 | Lane et al. | | |
| 2020/0028545 A1 | 1/2020 | Koskela et al. | | |
| 2020/0029274 A1 | 1/2020 | Cheng et al. | | |
| 2020/0059280 A1 | 2/2020 | Thurfjell et al. | | |
| 2020/0068644 A1* | 2/2020 | Zhou | H04B 7/0695 | |
| 2020/0091978 A1* | 3/2020 | Noh | H04B 7/0686 | |
| 2020/0136708 A1 | 4/2020 | Pan et al. | | |
| 2020/0145079 A1 | 5/2020 | Marinier et al. | | |
| 2020/0145929 A1* | 5/2020 | Ryu | H04W 52/242 | |
| 2020/0178134 A1* | 6/2020 | Yang | H04W 36/00838 | |
| 2020/0178261 A1* | 6/2020 | Ioffe | H04L 1/1812 | |
| 2020/0204336 A1* | 6/2020 | Petersson | H01Q 21/08 | |
| 2020/0220603 A1* | 7/2020 | Hao | H04B 7/0695 | |
| 2020/0220631 A1* | 7/2020 | Onggosanusi | H04B 17/327 | |
| 2020/0228190 A1* | 7/2020 | Cirik | H04B 7/0695 | |
| 2020/0259618 A1* | 8/2020 | Yang | H04W 72/0453 | |
| 2020/0259703 A1* | 8/2020 | Cirik | H04B 7/088 | |
| 2020/0260300 A1* | 8/2020 | Cirik | H04B 7/088 | |
| 2020/0314906 A1* | 10/2020 | Goyal | H04W 74/0816 | |
| 2020/0351798 A1 | 11/2020 | Ji et al. | | |
| 2020/0358509 A1* | 11/2020 | Wernersson | H04B 7/0617 | |
| 2020/0366348 A1* | 11/2020 | Bolotin | H04L 5/0055 | |
| 2020/0367083 A1* | 11/2020 | Hao | H04B 7/0626 | |
| 2020/0374806 A1* | 11/2020 | Manolakos | H04W 52/325 | |
| 2020/0374960 A1* | 11/2020 | Deenoo | H04B 7/088 | |
| 2020/0383060 A1 | 12/2020 | Park et al. | | |
| 2020/0388935 A1* | 12/2020 | Lee | H04L 27/2634 | |
| 2021/0021325 A1* | 1/2021 | Davydov | H04W 76/19 | |
| 2021/0022094 A1* | 1/2021 | Luo | H04W 24/10 | |
| 2021/0036741 A1* | 2/2021 | Park | H04B 7/0404 | |
| 2021/0050898 A1* | 2/2021 | Yu | H04B 7/0695 | |
| 2021/0068077 A1* | 3/2021 | Raghavan | H04B 7/0802 | |
| 2021/0084672 A1* | 3/2021 | Gulati | H04W 72/21 | |
| 2021/0099958 A1* | 4/2021 | Bae | H04W 52/146 | |
| 2021/0105780 A1* | 4/2021 | Jin | H04L 5/0098 | |
| 2021/0105860 A1 | 4/2021 | Tsai et al. | | |
| 2021/0111779 A1* | 4/2021 | Kundargi | H04B 16/28 | |
| 2021/0119688 A1 | 4/2021 | Enescu et al. | | |
| 2021/0127379 A1* | 4/2021 | Harrebek | H04B 7/0632 | |
| 2021/0136598 A1 | 5/2021 | Raghavan et al. | | |
| 2021/0144716 A1* | 5/2021 | Choi | H04W 76/27 | |
| 2021/0153085 A1* | 5/2021 | Rahman | H04L 5/0051 | |
| 2021/0153209 A1* | 5/2021 | Guan | H04W 80/02 | |

(56) References Cited

U.S. PATENT DOCUMENTS

| | | | |
|---|---|---|---|
| 2021/0159946 A1* | 5/2021 | Raghavan | H01Q 21/061 |
| 2021/0159966 A1* | 5/2021 | Xi | H04W 72/046 |
| 2021/0160850 A1* | 5/2021 | Akkarakaran | H04W 76/14 |
| 2021/0160881 A1* | 5/2021 | Rahman | H04L 5/0051 |
| 2021/0226681 A1 | 7/2021 | Raghavan et al. | |
| 2021/0234586 A1* | 7/2021 | Raghavan | H04B 7/0691 |
| 2021/0234593 A1* | 7/2021 | Raghavan | H04W 72/046 |
| 2021/0234597 A1* | 7/2021 | Raghavan | H04B 7/0617 |
| 2021/0234598 A1* | 7/2021 | Raghavan | H04B 17/309 |
| 2021/0234602 A1* | 7/2021 | Raghavan | H04B 7/0617 |
| 2021/0234604 A1* | 7/2021 | Raghavan | H04B 7/0456 |
| 2021/0235434 A1* | 7/2021 | Raghavan | H04B 7/088 |
| 2021/0250940 A1* | 8/2021 | Raghavan | H04W 52/40 |
| 2021/0251040 A1* | 8/2021 | Tang | H04W 56/001 |
| 2021/0265741 A1* | 8/2021 | Kenington | H01Q 21/24 |
| 2021/0329621 A1* | 10/2021 | Raghavan | H04W 72/046 |
| 2021/0359826 A1* | 11/2021 | Wang | H04L 5/00 |
| 2021/0410094 A1* | 12/2021 | Cui | H04W 56/0055 |
| 2022/0006539 A1* | 1/2022 | Sun | H04B 7/0691 |
| 2022/0021422 A1* | 1/2022 | Kim | H04B 7/0408 |
| 2022/0070823 A1* | 3/2022 | Ma | H04W 72/02 |
| 2022/0086702 A1* | 3/2022 | Wang | H04B 7/088 |
| 2022/0149924 A1* | 5/2022 | Zhang | H04W 72/542 |
| 2022/0150717 A1* | 5/2022 | Geng | H01Q 3/20 |
| 2022/0200146 A1* | 6/2022 | Du | H01Q 3/36 |
| 2022/0201505 A1* | 6/2022 | Zhao | H04B 7/06966 |
| 2022/0210810 A1* | 6/2022 | Khoshnevisan | H04W 72/1268 |
| 2022/0210814 A1* | 6/2022 | Khoshnevisan | H04L 5/005 |
| 2022/0278713 A1* | 9/2022 | Tsui | H04L 5/14 |
| 2022/0278729 A1* | 9/2022 | Tsui | H04W 72/12 |
| 2022/0278875 A1* | 9/2022 | Tsui | H04L 5/1461 |
| 2022/0345908 A1* | 10/2022 | Takano | H04W 16/28 |
| 2023/0038585 A1* | 2/2023 | Tsui | H04L 5/0073 |
| 2023/0050488 A1* | 2/2023 | Tsui | H04W 72/0473 |
| 2023/0051329 A1* | 2/2023 | Flordelis | H04W 72/0453 |
| 2024/0027821 A1* | 1/2024 | Noguchi | G02B 6/0068 |
| 2024/0129922 A1 | 4/2024 | Raghavan et al. | |

FOREIGN PATENT DOCUMENTS

| | | | | |
|---|---|---|---|---|
| CN | 109391984 | A | | 2/2019 |
| CN | 109792610 | A | | 5/2019 |
| CN | 110073609 | A * | 7/2019 | H04B 7/0617 |
| CN | 110419117 | A | | 11/2019 |
| CN | 110419177 | A * | 11/2019 | G03F 7/0002 |
| CN | 109391984 | B * | 10/2020 | H04W 24/04 |
| CN | 113287349 | A * | 8/2021 | G01S 1/042 |
| CN | 113287349 | B * | 11/2022 | G01S 1/042 |
| EP | 3167653 | A1 | | 5/2017 |
| EP | 3536101 | A1 * | 9/2019 | H04B 7/0695 |
| JP | 2001526510 | | * | 12/2001 | H04W 16/28 |
| JP | 2001526510 | A | | 12/2001 |
| JP | 2013501480 | | * | 1/2013 | H04B 7/18506 |
| JP | 2013501480 | A | | 1/2013 |
| TW | 201902262 | A | | 1/2019 |
| TW | 201921882 | A | | 6/2019 |
| TW | 201937873 | A | | 9/2019 |
| WO | WO-2023096801 | A1 * | 6/2013 | H04L 27/3483 |
| WO | WO-2014130893 | A2 | | 8/2014 |
| WO | WO-2016000096 | A1 * | 1/2016 | H04B 7/10 |
| WO | WO-2016005843 | A1 | | 1/2016 |
| WO | WO-2016148838 | | | 9/2016 |
| WO | WO-2016148838 | A1 * | 9/2016 | H04W 76/36 |
| WO | WO-2016207610 | A1 * | 12/2016 | H04W 72/23 |
| WO | WO-2017007564 | A1 | | 1/2017 |
| WO | WO-2017204546 | A1 * | 11/2017 | H04N 21/23605 |
| WO | WO-2018075205 | A1 * | 4/2018 | H04L 5/0092 |
| WO | WO-2018085709 | A1 * | 5/2018 | H04B 7/088 |
| WO | WO-2018128885 | A1 * | 7/2018 | H01Q 3/24 |
| WO | WO-2018144844 | A1 | | 8/2018 |
| WO | WO-2018215050 | A1 * | 11/2018 | H04B 7/088 |
| WO | WO-2018219438 | A1 * | 12/2018 | H04B 7/0632 |
| WO | WO-2019014041 | A1 * | 1/2019 | |
| WO | WO-2019029609 | A1 | | 2/2019 |
| WO | WO-2019140256 | A1 | | 7/2019 |
| WO | WO-2019192005 | A1 | | 10/2019 |
| WO | WO-01923889 | A1 | | 11/2019 |
| WO | WO-2019213889 | A1 * | 11/2019 | H04B 7/0404 |
| WO | WO-2020020453 | A1 * | 11/2019 | H04B 7/0628 |
| WO | WO-2019231716 | A1 | | 12/2019 |
| WO | WO-2020096903 | A1 | | 5/2020 |
| WO | WO-2020101757 | A1 * | 5/2020 | H04B 7/063 |
| WO | WO-2021041533 | A1 | | 3/2021 |
| WO | WO-2021144114 | A1 * | 7/2021 | |
| WO | WO-2021154737 | A2 * | 8/2021 | H04B 7/06966 |
| WO | WO-201154737 | A9 * | 9/2021 | H01Q 21/24 |
| WO | WO-2021154737 | A9 * | 9/2021 | H04B 7/06966 |
| WO | WO-2021228376 | A1 * | 11/2021 | H01Q 21/24 |
| WO | WO-2022170622 | A1 | | 8/2022 |

OTHER PUBLICATIONS

Raghaven et al, Antenna Placement and Performace Tradeoffs With hand Blockage in Millimeter Wave Systems, IEEE, Apr. 2019 (Year: 2019).*

I.K. Jain, Millimeter Wave Beam Training—A Survey, arXic, Sep. 2018 (Year: 2018).*

Zheng et al. Time of Arrival and Time Su Arrival Based NLOS Identification and Localization, IEEE 2012 (Year: 2012).*

A. Ali, N. González-Prelcic and R. W. Heath, "Spatial Covariance Estimation for Millimeter Wae Hybrid Systems Using Out-of-Band Information," in IEEE Transactions on Wireless Communications, vol. 18, No. 12, pp. 5471-5485, Dec. 2019, (Cited in IDS of Jun. 23, 2023) (Year: 2019).*

Y. Du et al. Evaluation of PMI Feedback Schemes for MU-MIMO Pairing, IEEE, Dec. 2010 (Year: 2010) (Year: 2010).*

I.K. Jain Millimeter Wave Beam Training—A Survey, arXiv, Sep. 2018 (Year: 2018 (Year: 2018.*

Zheng et al. Time of Arrival and Time Sum of Arrival Based NLOS Identification and Localization, IEEE 2012 (Year: 2012) (Year: 2012).*

I.K. Jain, Millimeter Wave Beam Training—A Survey, arXiv, Sep. 2018 (Year: 2018).*

Ali et al., Spatial_Covariance_Estimation_for_Millimeter_Wave_Hybrid_Systems_Using_Out-of-Band_Information, IEEE 2019 (Year: 2019).*

Y. Du et al. Evaluation of PMI Feedback Schemes for MU-MIMO Pairing, IEEE, Dec. 2010 (Year: 2010).*

Zheng et al. Time of Arrival and Time Sum of Arrival Based NLOS Identification and Localization, IEEE 2012 (Year: 2012).*

Cheng Chen, Resoluion to CIDs related to asymmetric beamforming and directiona allocation, IEEE P802.11, Jan. 15, 2018 (Year: 2018).*

3GPP TSG RAN WG1, R1-2006985, #102 Meeting, Aug. 17-28, 2020 (Year: 2020).*

Raghaven et al, Antenna Placement and Performance Tradeoffs With Hand Blockage in Millimeter Wave Systems, IEEE, Apr. 2019 (Year: 2019).*

Cheng Chen, Resolution to CIDs related to asymmetric beamforming and directional allocation, IEEE P802.11, Jan. 15, 2018 (Year: 2018).*

3GPP TSG RAN WG1 #98, R1-1908233 Views on Panel Activation and Deactivation, Aug. 2019 (Year: 2019).*

Catt: "Consideration on Multi-Beam Enhancements", 3GPP Draft; 3GPP TSG RAN WG1 Meeting #98, R1-1908603, 3rd Generation Partnership Project (3GPP), Mobile Competence Centre; 650, Route Des Lucioles; F-06921 Sophia-Antipolis Cedex; France, vol. RAN WG1, No. Prague, CZ; Aug. 26, 2019-Aug. 30, 2019, Aug. 17, 2019 (Aug. 17, 2019), XP051765211, 7 Pages, Retrieved from the Internet: URL: http://www.3gpp.org/ftp/tsg_ran/WG1_RL1/TSGR1_98/Docs/R1-1908603.zip [retrieved on Aug. 17, 2019], chapter 3; pp. 3,4, p. 2, paragraph section 2.1-p. 3, paragraph section 2.2.

Motorola Mobility, et al., "Power Control for Multi-Panel Uplink Transmission", 3GPP TSG RAN WG1 AH-1901, 3GPP Draft; R1-1900944-PC-EMIMO-OTHER-FINAL, 3rd Generation Partnership Project (3GPP), Mobile Competence Centre; 650, Route Des Lucioles; F-06921 Sophia-Antipolis Cedex; France, vol. RAN WG1, No. Taipei; Jan. 21, 2019-Jan. 25, 2019, 4 Pages, Jan. 20, 2019 (Jan.

(56) References Cited

OTHER PUBLICATIONS 20, 2019), XP051593788, Retrieved from the Internet: URL: http://www.3gpp.org/ftp/Meetings%5F3GPP%5FSYNC/RAN1/Docs/R1%2D1900944%2Ezip [retrieved on Jan. 20, 2019] p. 2, paragraph section 2.1-p. 3, paragraph section 2.2.
SAMSUNG: "Discussions on NR UL Multi-Panel/Multi-TRP", 3GPP TSG RAN WG1 Meeting #90, 3GPP Draft; R1-1713579 UL MULTI TRP PANEL V0, 3rd Generation Partnership Project (3GPP), Mobile Competence Centre 650, Route Des Lucioles; F-06921 Sophia-Antipolis Cedex; France, vol. RAN WG1, No. Prague, Czechia; Aug. 21, 2017-Aug. 25, 2017, 3 Pages, Aug. 20, 2017 (Aug. 20, 2017), XP051316379, Retrieved from the Internet: URL: http://www.3gpp.org/ftp/Meetings_3GPP_SYNC/RAN1/Docs/ [retrieved on Aug. 20, 2017] p. 2-p. 3, figure 2.
Fraunhofer Iis, et al., "Discussion on Signaling of Beam Correspondence", 3GPP TSG RAN WG1 Meeting #94bis, 3GPP Draft; R1-1811086_Discussion_On_Signaling_of_Beam_Correspondence, 3rd Generation Partnership Project (3GPP), Mobile Competence Centre; 650, Route Des Lucioles; F-06921 Sophia-Antipolis Cedex, vol. RAN WG1, No. Chengdu, China; Oct. 8, 2018-Oct. 12, 2018, Sep. 28, 2018 (Sep. 28, 2018), 5 Pages, XP051518487, Retrieved from the Internet: URL: http://www.3gpp.org/ftp/tsg%5Fran/WG1%5FRL1/TSGR1%5F94b/Docs/R1%201811086%2Ezip [retrieved on Sep. 28, 2018], Sections 2-4; Figures 1-3.
Mediatek Inc: "Discussion on UL Beam Management Procedure", 3GPP TSG RAN WG1 Meeting #88, 3GPP Draft; R1-1702731 Discussion On UL Beam Management Procedure Final, 3rd Generation Partnership Project (3GPP), Mobile Competence Centre ; 650, Route Des Lucioles; F-06921 Sophia-Antipolis Cedex, vol. RAN WG1, No. Athens, Greece; Feb. 13, 2017-Feb. 17, 2017, Feb. 12, 2017 (Feb. 12, 2017), XP051209878, 4 Pages, Retrieved from the Internet: URL:http://www.3gpp.org/ftp/Meetings_3GPP_SYNC/RAN1/Docs/ [retrieved on Feb. 12, 2017]. sections 2-4.
Huawei, et al., "UL/DL BM for Latency/Overhead Reduction", 3GPP Draft, R1-1903974, 3GPP TSG RAN WG1 #96bis, 3rd Generation Partnership Project (3GPP), Mobile Competence Centre, 650, Route Des Lucioles, F-06921 Sophia-Antipolis Cedex, France, vol. Ran WG1, No. Xi'an, China, Apr. 8, 2019-Apr. 12, 2019, Apr. 7, 2019 (Apr. 7, 2019), XP051699387, 8 Pages, Retrieved from the Internet: URL:http://www.3gpp.org/ftp/Meetings%5F3GPP%5FSYNC/RAN1/Docs/R1%2D1903974%2Ezip [retrieved on Apr. 7, 2019] the Whole Document.
Lenovo, et al., "Discussion of Beam Failure Recovery for Carrier Aggregation", 3GPP Draft, 3GPP TSG RAN WG1 Meeting #92, R1-1804211_BFR, 3rd Generation Partnership Project (3GPP), Mobile Competence Centre, 650, Route Des Lucioles, F-06921 Sophia-Antipolis Cedex, France, vol. RAN WG1, No. Sanya, China, Apr. 16, 2018-Apr. 20, 2018, Apr. 6, 2018, XP051413160, 3 Pages, Retrieved from the Internet: URL:http://www.3gpp.org/ftp/tsg%5Fran/WG1%5FRL1/TSGR1%5F92b/Docs/, http://www.3gpp.org/ftp/tsg%5Fran/WG1%5FRL1/TSGR1%5F92b/Docs/, [retrieved on Apr. 6, 2018], p. 1, line 15-line 16 p. 2, line 6-line 16, the Whole Document.
Samsung: "Remaining Details on QCL", 3GPP Draft, 3GPP TSG RAN WG1 #90b, R1-1717634-QCL V2, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Oct. 9, 2017-Oct. 13, 2017, Oct. 8, 2017 (Oct. 8, 2017), XP051340820, 9 Pages, Retrieved from the Internet: URL:http://www.3gpp.org/ftp/Meetings_3GPP_SYNC/RAN1/Docs/ retrieved on Oct. 8, 2017] p. 6-p. 7 p. 3.
Ericsson: "FFSs Regarding Early Measurement Configurations", 3GPP Draft, 3GPP TSG-RAN WG2#106, R2-1907254—FFSS Regarding Early Measurement Configurations, 3rd Generation Partnership Project (3GPP), Mobile Competence Centre, 650, Route Des Lucioles, F-06921 Sophia-Antipolis Cedex, vol. RAN WG2, No. Reno, Nevada, USA, May 13, 2019-May 17, 2019 May 13, 2019 (May 13, 2019), XP051730695, pp. 1-4, Retrieved from the Internet: URL:http://www.3gpp.org/ftp/Meetings%5F3GPP%5FSYNC/RAN2/Docs/R2%2D1907254%2Ezip [retrieved on May 13, 2019] p. 3, paragraph 2.3 p. 4, paragraph 2.4.
Huawei et al., "Low Latency of SCell Activation", 3GPP Draft, 3GPP TSG RAN WG1 Meeting #96bis, R1-1903992, 3rd Generation Partnership Project (3GPP), Mobile Competence Centre, 650, Route Des Lucioles, F-06921 Sophia-Antipolis Cedex, France, vol. RAN WG1, No. Xi 'an, China, Apr. 8, 2019-Apr. 12, 2019, Apr. 7, 2019 (Apr. 7, 2019), XP051699403, 6 Pages, Retrieved from the Internet: URL:http://www.3gpp.org/ftp/Meetings%5F3GPP%5FSYNC/RAN1/Docs/R1%2D1903992%2Ezip [retrieved on Apr. 7, 2019] p. 2, paragraph 2.3-p. 3, paragraph 2.4 p. 4, paragraph 3 figures 3-5.
Interdigital., et al., "Views on Panel Activation and Deactivation", 3GPP TSG RAN WG1 #98, 3GPP Draft; R1-1908233 Views on Panel Activation and Deactivation, 3rd Generation Partnership Project (3GPP), Mobile Competence Centre, 650, Route Des Lucioles, F-06921 Sophia-Antipolis Cedex, France, vol. RAN WG1, No. Prague, CZ; Aug. 26, 2019-Aug. 30, 2019, Aug. 16, 2019 (Aug. 16, 2019), 6 Pages, XP051764847, Retrieved from the Internet: URL: http://www.3gpp.org/ftp/tsg_ran/WG1_RL1/TSGR1_98/Docs/R1-1908233.zip, [retrieved on Aug. 16, 2019], Section 2, Section 3 (p. 5, gNB-Driven), figures 1-3.
Du, Y., et al., "Evaluation of PMI Feedback Schemes for MU-MIMO Pairing", IEEE Systems Journal, IEEE, US, vol. 4, No. 4, Dec. 1, 2010 (Dec. 1, 2010), XP011320688, pp. 505-510, ISSN: 1932-8184 p. 505.
International Search Report and Written Opinion—PCT/US2021/015104—ISA/EPO—dated Nov. 24, 2021.
Ali A., et al., "Spatial Covariance Estimation for Millimeter Wave Hybrid Systems using Out-of-Band Information", May 2019, Center for Transportation Research, pp. 1-14.
Nokia, et al., "On CSI-RS Design for DL Beam Management", 3GPP Draft, 3GPP TSG RAN WG1 #88, R1-1703179, Athens, Greece, Feb. 13-17, 2017, 14 Pages, Feb. 7, 2017.
InterDigital Inc: "Views on Panel Activation and Deactivation", 3GPP TSG RAN WG1 #98, R1-1908233, Prague, CZ, Aug. 26, 2019-Aug. 30, 2019, 6 Pages.
Fraunhofer Iis., et al., "Discussion on Signaling of Beam Correspondence", R1-1811086, 3GPP TSG RAN WG1 Meeting #94bis Chengdu, China Oct. 8-12, 2018, 5 Pages.
Mediatek Inc: "Discussion on UL Beam Management Procedure", R1-1702731, 3GPP TSG RAN WG1 Meeting #88 Athens, Greece, Feb. 13-17, 2017, 4 Pages.
Apple Inc: "FR2 DL Inter-Band CA Architecture Considerations", 3GPP RAN WG4 Meeting #93, R4-1913540, Reno, USA, Nov. 18-21, 2019, 8 Pages, Nov. 9, 2019.
Samsung: "Remaining Details on QCL"3GPP TSG RAN WG1#90b, R1-1717634, Prague, Czech Republic, Oct. 9-13, 2017, 9 Pages, Oct. 3, 2017, Section 4, 4.2 Intercarrier QCL.

* cited by examiner

ASYMMETRIC UPLINK-DOWNLINK BEAM TRAINING IN FREQUENCY BANDS

CROSS REFERENCE

The present application for patent claims the benefit of U.S. Provisional patent Application No. 62/966,506 by Raghavan et al., entitled "ASYMMETRIC UPLINK-DOWNLINK BEAM TRAINING IN UPPER MILLIMETER WAVE BANDS," filed Jan. 27, 2020, assigned to the assignee hereof, and expressly incorporated by reference in its entirety herein.

INTRODUCTION

The following relates to wireless communications and more specifically to uplink-downlink beam training.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method of wireless communications at a first wireless device is described. The method may include transmitting, to the second wireless device, an indication of a collective antenna array including at least a first set of antenna elements for downlink communications with the second wireless device and a second set of antenna elements for uplink communications with the second wireless device, the first set of antenna elements being different from the second set of antenna elements. Additionally the method may include receiving, from the second wireless device, a set of amplitude and phase beam weights for each antenna element in the collective antenna array, and communicating with the second wireless device based on the collective antenna array.

An apparatus for wireless communications at a first wireless device is described. The apparatus may include a processor and memory coupled with the processor, the processor and memory configured to cause the apparatus to transmit, to a second wireless device, an indication of a collective antenna array including at least a first set of antenna elements for downlink communications with the second wireless device and a second set of antenna elements for uplink communications with the second wireless device, the first set of antenna elements being different from the second set of antenna elements. The memory and processor may further be configured to receive, from the second wireless device, a set of amplitude and phase beam weights for each antenna element in the collective antenna array and to communicate with the second wireless device based on the collective antenna array.

Another apparatus for wireless communications at a first wireless device is described. The apparatus may include means for transmitting, to a second wireless device, an indication of a collective antenna array including at least a first set of antenna elements for downlink communications with the second wireless device and a second set of antenna elements for uplink communications with the second wireless device, the first set of antenna elements being different from the second set of antenna elements. The apparatus may further include means for receiving, from the second wireless device, a set of amplitude and phase beam weights for each antenna element in the collective antenna array and for communicating with the second wireless device based on the collective antenna array.

A non-transitory computer-readable medium storing code for wireless communications at a first wireless device is described. The code may include instructions executable by a processor to transmit, to a second wireless device, an indication of a collective antenna array including at least a first set of antenna elements for downlink communications with the second wireless device and a second set of antenna elements for uplink communications with the second wireless device, the first set of antenna elements being different from the second set of antenna elements. The may further include instructions executable by the processor to receive, from the second wireless device, a set of amplitude and phase beam weights for each antenna element in the collective antenna array and to communicate with the second wireless device based on the collective antenna array.

Some examples of the method, apparatuses, and non-transitory computer-readable medium described herein may further include operations, features, means, or instructions for adjusting the collective antenna array based on the first set of antenna elements changing, the second set of antenna elements changing, or both and for transmitting, to the second wireless device, an indication of the adjusted collective antenna array.

Some examples of the method, apparatuses, and non-transitory computer-readable medium described herein may further include operations, features, means, or instructions for receiving, from the second wireless device, a set of amplitude and phase beam weights for each antenna element in the collective antenna array and for determining a first subset of beam weights for the first set of antenna elements and a second subset of beam weights for the second set of antenna elements, the first subset of beam weights and the second subset of beam weights being based on the set of beam weights for the collective antenna array.

Some examples of the method, apparatuses, and non-transitory computer-readable medium described herein may further include operations, features, means, or instructions for determining an uplink transmit beam to communicate with the second wireless device based on the indication of the downlink receive beam.

In some examples of the method, apparatuses, and non-transitory computer-readable medium described herein, the downlink receive beam and the uplink transmit beam may include a beam correspondence pair, a quasi co location (QCL) beam pair, or a combination thereof.

Some examples of the method, apparatuses, and non-transitory computer-readable medium described herein may further include operations, features, means, or instructions for performing a beam training procedure for the collective antenna array and for determining a first set of beam weights for the first set of antenna elements and a second set of beam weights for the second set of antenna elements based on the beam training procedure for the collective antenna array.

Some examples of the method, apparatuses, and non-transitory computer-readable medium described herein may further include operations, features, means, or instructions for receiving, from the second wireless device, one or more aperiodic training signals for use with the collective antenna array as part of the beam training procedure. Subsequently, examples of the method, apparatuses, and non-transitory computer-readable medium described herein may include operations, features, means, or instructions for transmitting, to the second wireless device, one or more measurement reports corresponding to the received aperiodic training signals and for receiving, from the second wireless device, an indication of a downlink receive beam based on the one or more measurement reports.

In some examples of the method, apparatuses, and non-transitory computer-readable medium described herein, the indication of the collective antenna array may be transmitted to the second wireless device as part of the beam training procedure.

Some examples of the method, apparatuses, and non-transitory computer-readable medium described herein may further include operations, features, means, or instructions for identifying a set of sets of antenna elements for the downlink communications with the second wireless device, where the second set of antenna elements includes the set of sets of antenna elements. The examples of the method, apparatuses, and non-transitory computer-readable medium described herein may then include operations, features, means, or instructions for performing a beam training procedure for each set of antenna elements of the set of sets of antenna elements and for receiving, from the second wireless device, a first set of beam weights for the set of sets of antenna elements based on the beam training procedure. Subsequently, the examples of the method, apparatuses, and non-transitory computer-readable medium described herein may include operations, features, means, or instructions for generating a second set of beam weights for the second set of antenna elements based on the first set of beam weights.

In some examples of the method, apparatuses, and non-transitory computer-readable medium described herein, the beam training procedure may be performed according to time division multiplexing.

In some examples of the method, apparatuses, and non-transitory computer-readable medium described herein, the collective antenna array may include the second set of antenna elements.

In some examples of the method, apparatuses, and non-transitory computer-readable medium described herein, each set of antenna elements of the set of sets of antenna elements may be used for the downlink communications with the second wireless device for different time symbols.

In some examples of the method, apparatuses, and non-transitory computer-readable medium described herein, the collective antenna array may include a planar antenna array encompassing at least both the first set of antenna elements and the second set of antenna elements.

In some examples of the method, apparatuses, and non-transitory computer-readable medium described herein, the first set of antenna elements may neither subsume the second set of antenna elements, nor the second set of antenna elements may subsume the first set of antenna elements.

In some examples of the method, apparatuses, and non-transitory computer-readable medium described herein, the mmW frequency band includes frequencies that may be greater than 52.6 GHz.

In some examples of the method, apparatuses, and non-transitory computer-readable medium described herein, the first wireless device may be a UE or a customer premises equipment (CPE) in a wireless communications system, and the second wireless device may be a base station, a CPE, a relay device, a router, a repeater, or an integrated access and backhaul (IAB) node in the wireless communications system.

In some examples of the method, apparatuses, and non-transitory computer-readable medium described herein, the set of amplitude and phase beam weights includes a set of amplitude and phase shifter beam weights.

A method of wireless communications at a second wireless device is described. The method may include receiving, from a first wireless device that is in communications with the second wireless device via a mmW frequency band, an indication of a collective antenna array for the communications with the first wireless device, the collective antenna array including a first set of antenna elements for downlink communications with a first wireless device and a second set of antenna elements for uplink communications with the first wireless device. Additionally, the method may include communicating with the first wireless device on the first set of antenna elements and the second set of antenna elements based on a set of beam weights associated with a beam training procedure.

An apparatus for wireless communications at a second wireless device is described. The apparatus may include a processor and memory coupled with the processor, the processor and memory configured to cause the apparatus to receive, from a first wireless device that is in communications with the second wireless device via a mmW frequency band, an indication of a collective antenna array for the communications with the first wireless device, the collective antenna array including a first set of antenna elements for downlink communications with a first wireless device and a second set of antenna elements for uplink communications with the first wireless device. Additionally, the processor and memory may be configured to cause the apparatus to communicate with the first wireless device on the first set of antenna elements and the second set of antenna elements based on a set of beam weights associated with a beam training procedure.

Another apparatus for wireless communications at a second wireless device is described. The apparatus may include means for receiving, from a first wireless device that is in communications with the second wireless device via a mmW frequency band, an indication of a collective antenna array for the communications with the first wireless device, the collective antenna array including a first set of antenna elements for downlink communications with a first wireless device and a second set of antenna elements for uplink communications with the first wireless device. Additionally, the apparatus may include means for communicating with the first wireless device on the first set of antenna elements and the second set of antenna elements based on a set of beam weights associated with a beam training procedure.

A non-transitory computer-readable medium storing code for wireless communications at a second wireless device is described. The code may include instructions executable by a processor to receive, from a first wireless device that is in communications with the second wireless device via a mmW frequency band, an indication of a collective antenna array for the communications with the first wireless device, the collective antenna array including a first set of antenna elements for downlink communications with a first wireless device and a second set of antenna elements for uplink communications with the first wireless device. Additionally, the code may include instructions executable by a processor to communicate with the first wireless device on the first set of antenna elements and the second set of antenna elements based on a set of beam weights associated with a beam training procedure.

Some examples of the method, apparatuses, and non-transitory computer-readable medium described herein may further include operations, features, means, or instructions for performing the beam training procedure for the collective antenna array, determining a downlink receive beam for the first set of antenna elements based on the beam training procedure for the collective antenna array and transmitting, to the first wireless device, an indication of the downlink receive beam for the first wireless device to use for the downlink communications.

Some examples of the method, apparatuses, and non-transitory computer-readable medium described herein may further include operations, features, means, or instructions for determining one or more aperiodic training signals to transmit to the first wireless device as part of the beam training procedure. Subsequently, the examples of the method, apparatuses, and non-transitory computer-readable medium described herein may include operations, features, means, or instructions for transmitting, to the first wireless device, the one or more aperiodic training signals for use with the collective antenna array as part of the beam training procedure and for receiving, to the second wireless device, one or more measurement reports corresponding to the transmitted aperiodic training signals, where the downlink receive beam may be determined based on the one or more measurement reports.

Some examples of the method, apparatuses, and non-transitory computer-readable medium described herein may further include operations, features, means, or instructions for determining the first set of antenna elements, the second set of antenna elements, or both need a beam refinement and for performing a beam refinement procedure based on the determination.

In some examples of the method, apparatuses, and non-transitory computer-readable medium described herein, the beam refinement procedure may include a beam training procedure.

Some examples of the method, apparatuses, and non-transitory computer-readable medium described herein may further include operations, features, means, or instructions for transmitting, to the first wireless device, a set of amplitude and phase beam weights for each antenna element in the collective antenna array.

In some examples of the method, apparatuses, and non-transitory computer-readable medium described herein, the collective antenna array may include a planar antenna array encompassing at least both the first set of antenna elements and the second set of antenna elements.

In some examples of the method, apparatuses, and non-transitory computer-readable medium described herein, the first set of antenna elements may neither subsume the second set of antenna elements, nor the second set of antenna elements may subsume the first set of antenna elements.

In some examples of the method, apparatuses, and non-transitory computer-readable medium described herein, the mmW frequency band may include frequencies that may be greater than 52.6 GHz.

In some examples of the method, apparatuses, and non-transitory computer-readable medium described herein, the first wireless device may be a UE or a CPE in a wireless communications system, and the second wireless device may be a base station, a CPE, a relay device, a router, a repeater, or an IAB node in the wireless communications system.

DETAILED DESCRIPTION

Figure 1:
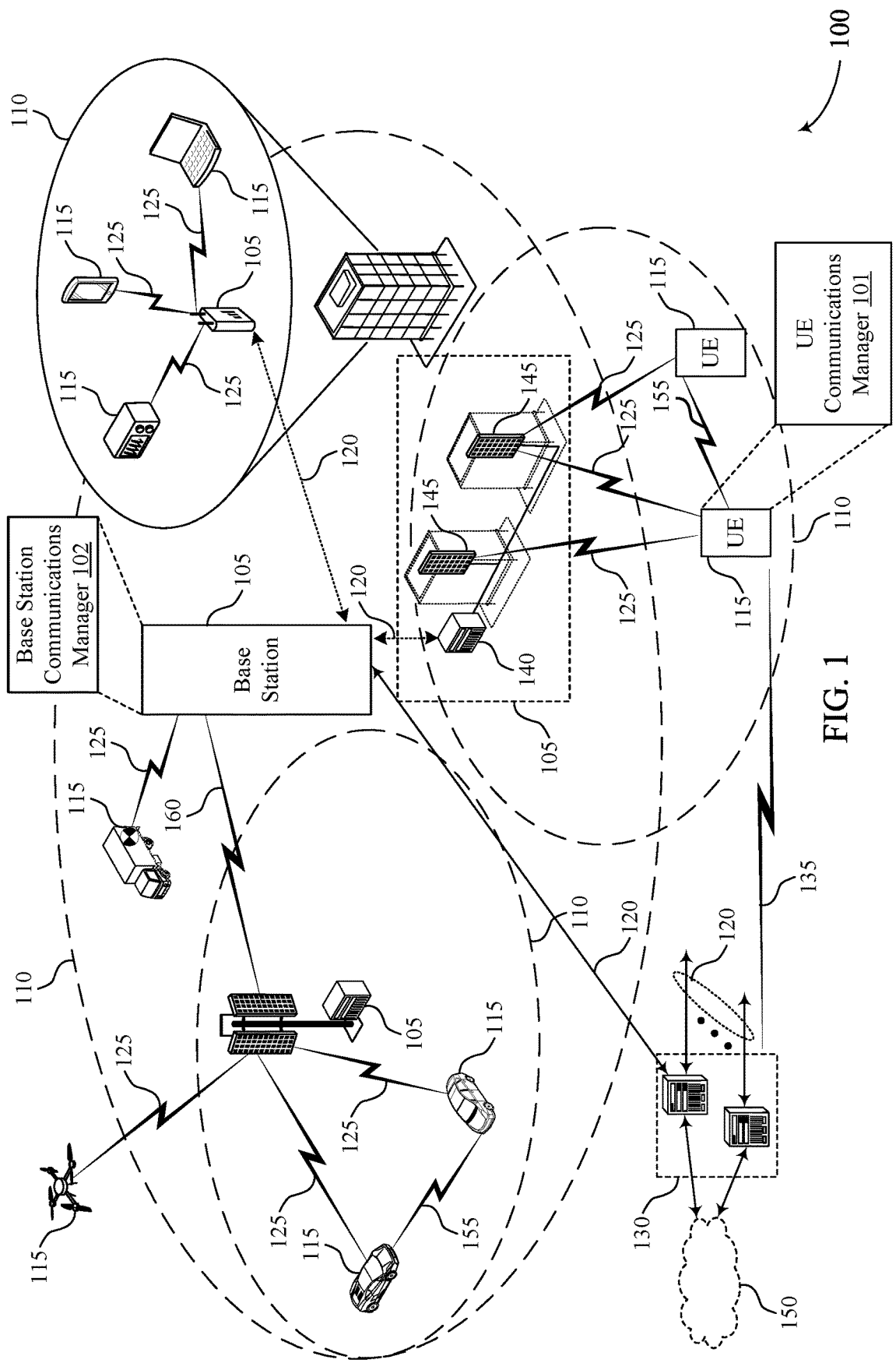
FIG. 1 illustrates an example of a system for wireless communications that supports asymmetric uplink-downlink beam training in frequency bands in accordance with one or more aspects of the present disclosure.

In some deployments, wireless communications systems may operate in mmW frequency ranges (e.g., 24 GHz, 26 GHz, 28 GHz, 39 GHz, 52.6-71 GHz, etc.). Wireless communications at these frequencies may be associated with increased signal attenuation (e.g., path loss, penetration loss, blockage loss), which may be influenced by various factors, such as diffraction, propagation environment, density of blockages, material properties, etc. As a result, signal processing techniques, such as beamforming, may be used to coherently combine energy and overcome the path losses at these frequencies. Due to the increased amount of path, penetration and blockage losses in mmW communications systems, transmissions between wireless devices (e.g., from a base station and/or a UE) may be beamformed. Moreover, a receiving device may use beamforming techniques to configure antenna(s) and/or antenna array(s) and/or antenna array module(s) such that transmissions are received in a directional manner.

In some deployments, communications in mmW frequencies may utilize what is referred to as frequency range 2 (FR2), corresponding to deployments in 24-52.6 GHz (e.g., 24 GHz. 26 GHz, 28 GHz, 39 GHz, etc.). As demand for wireless communications increases, additional mmW frequencies may be desirable for some deployments, such as frequency range 4 (FR4) (also informally known as or upper mmW bands) which may be associated with 52.6 GHz and beyond. In many FR2 deployments, wireless devices use antenna modules that include a number of antenna elements, such as an array of four antenna elements per module in a 4×1 array arrangement, among other example configurations. Upper mmW bands have shorter wavelengths, and thus more antenna elements can be placed in the same physical aperture in FR4 than at FR2. For example, an FR4 device may have multiple antenna modules that each contain four 4×4 subarrays. In some cases, it may be easier for a wireless device (e.g., a UE) to use or manage some possible combinations of antenna elements across subarrays within an antenna module or across antenna modules than others.

For example, different arrays/subarrays of antenna elements may be used for downlink and for uplink communications, affecting beam correspondence (e.g., beams used for downlink communications may not point in the same direction as beams for the uplink communications based on the antenna elements being used for each of the uplink and downlink communications are on different areas of the overall antenna array). Additionally, the different subarrays may be dramatically different based on the higher number of antenna panels and elements used in FR4. As such, beam training may be performed separately for both uplink and for downlink, thereby doubling beam training overhead (e.g., doubling the amount of signaling used to determine which beams to use for which transmission direction).

As described herein, a UE (or any other device that communicates using mmW) may identify an anchor antenna array (e.g., a collective antenna array) that includes both a downlink antenna array and an uplink antenna array for communications (e.g., common sets of antenna elements to uplink and downlink communications). In some cases, the collective antenna array may be a regular/planar configuration (if possible) and may be a superset of antenna elements in the uplink and downlink sets of antenna elements. Accordingly, the UE and a base station may perform a beam training procedure on the collective antenna array (e.g., determine what power to use at each antenna element in an antenna array to form a corresponding beam for communicating with a base station or other wireless device), and the UE may then use beam weights (e.g., the different powers at the different antenna elements) identified for the collective antenna array as the beam weights for the specific downlink antenna array and the uplink antenna array. For example, the UE and the base station may perform downlink beam training to obtain a best downlink receive beam to use and then determine an uplink transmit beam to use based on the downlink receive beam (e.g., QCL, beam correspondence, etc.). The QCL beam correspondence, for example, may indicate an uplink beam direction that is about the same (e.g., has similar properties) as the downlink receive beam. Additionally or alternatively, two antenna ports are said to be quasi-co located if properties of the channel over which a symbol on one antenna port is conveyed can be inferred from the channel over which a symbol on the other antenna port is conveyed. Such properties may include, for example, doppler shift, doppler speed, average delay, delay spread, spatial receive parameter, among other examples.

In some cases, a set of antenna elements for the downlink communications and/or a set of antenna elements for the uplink communications may change. For example, additional sets of antenna elements may be used, different antenna elements may be used, etc., which may change with time. Accordingly, coordinated changes of the collective antenna array may be signaled as the necessary sets of antenna elements for the downlink and uplink communications (e.g., uplink/downlink antenna array) change. For example, the UE may change the collective antenna array dynamically and may coordinate this change with the base station.

As described here, one or more aspects of the disclosure may enable efficient full-duplex assessment. For example, aspects of the disclosure described herein may be applied to a full-duplex system in which simultaneous transmission and reception is enabled. In some examples, the UE and the base station may perform simultaneous beam training procedures for uplink transmissions and for downlink transmissions respectively and may determine separate arrays for communicating via uplink and via downlink.

Aspects of the disclosure are initially described in the context of wireless communications systems. Additionally, aspects of the disclosure are illustrated through a wireless communication device with multiple antenna arrays, an additional wireless communications system, examples of collective antenna arrays, and a process flow. Aspects of the disclosure are further illustrated by and described with reference to apparatus diagrams, system diagrams, and flowcharts that relate to asymmetric uplink-downlink beam training in frequency bands.

FIG. 1 illustrates an example of a wireless communications system 100 that supports antenna group selection and indication in mmW bands in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, repeater devices, CPE, IAB nodes, router devices, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. In some examples, the one or more base stations 105 may provide backhaul connectivity between another base station 105 and core network 130 via a backhaul link 160 while acting as an IAB node. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays, routers, or CPE, as well as the base stations 105 and the network equipment including macro eNBs or gNBs, small cell eNBs or gNBs, IAB nodes, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). Oftentimes, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an EHF region of the spectrum (e.g., from 30 GHz to 300 GHz), also known as the millimeter band. In some examples, the wireless communications system 100 may support mmW communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions). In some cases, the above described techniques to identify a beam for communications between two wireless devices (e.g., such as between a UE 115 and a base station 105) may be part of a beam training procedure.

UEs 115 may include one or more antenna modules that may include a relatively large number of antenna elements for mmW communications and may be an example of a first wireless device as discussed herein. A UE communications manager 101 may manage mmW communications and, in some cases, may identify a first set of antenna elements for downlink communications with a second wireless device (e.g., a base station 105) and a second set of antenna elements for uplink communications with the second wireless device. The UE communications manager 101 may then determine a collective antenna array (e.g., an anchor antenna array) that includes at least the first set of antenna elements and the second set of antenna elements and may provide an indication of the collective antenna array to the second wireless device. The second wireless device, in some cases, may initiate a beam training based on the collective antenna array in order to establish one or more beams to be used for communications using the first and second sets of antenna elements based on beam weights determined from the beam training for the collective antenna array indicated by the UE communications manager 101.

One or more of the base stations 105 may be an example of a second wireless device as discussed herein, and may include a base station communications manager 102. The base station communications manager 102 may receive the indication of the collective antenna array from the first wireless device and may, in some cases, initiate a beam training procedure based on the collective antenna array to determine beam weights for antenna elements in the collective antenna array for forming one or more beams to be used for communications with the first wireless device. The beam training procedure may be used to determine one or more beams to be used for communications using the first and second sets of antenna elements in the collective antenna array indicated by the first wireless device. For example, the base station communications manager 102 may determine a downlink beam the first wireless device should use for receiving downlink messages from the second wireless device (e.g., through the beam training procedure) and indicate the determined downlink beam to the first wireless device. Subsequently, the first wireless device may then determine an uplink beam to use for transmitting uplink messages to the second wireless device based on the determined downlink beam (e.g., through a QCL relationship).

Figure 2:
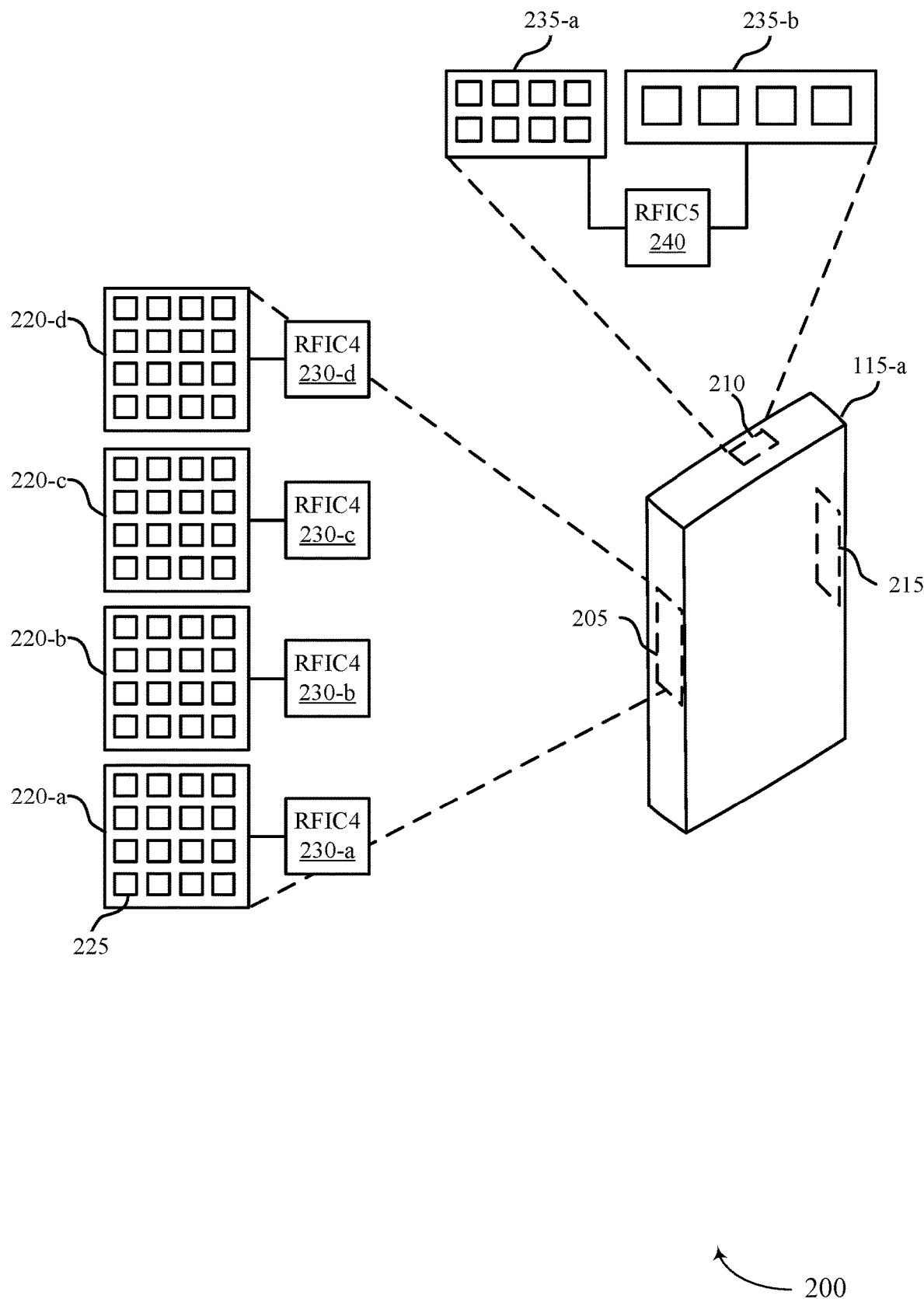
FIG. 2 illustrates an example of a wireless communication device with multiple antenna arrays that supports asymmetric uplink-downlink beam training in frequency bands in accordance with one or more aspects of the present disclosure.

FIG. 2 illustrates an example of a wireless communication device with multiple antenna arrays 200 that supports asymmetric uplink-downlink beam training in frequency bands in accordance with one or more aspects of the present disclosure. In some examples, wireless communication device with multiple antenna arrays 200 may implement aspects of wireless communications system 100. In this example, the wireless communication device may be a UE 115-a, although in other cases the wireless communication device may be a different device, such as a CPE, a relay device, a router, a repeater, or an IAB node.

In this example, the UE 115-a includes a number of different antenna modules, including a first antenna module 205, a second antenna module 210, and a third antenna module 215. Each of the antenna modules 205 through 215 may include a number of subarrays 220 of antenna elements. In this example, the first antenna module 205 may include four subarrays 220, including a first subarray 220-a, a second subarray 220-b, a third subarray 220-c, and a fourth subarray 220-d. Each subarray 220 in this example may include 16 individual antenna elements 225 arranged in a 4×4 array configuration. Each antenna element 225, in some cases, may be a patch antenna element configured to communicate in a high-band mmW deployment. In some cases, the spacing of antenna elements 225 within each subarray 220 may be configured to provide for efficient analog beamforming at wavelengths associated with high-band mmW communications (e.g., in FR4). Further, in this example, each subarray 220 may include an associated radio frequency integrated circuit (RFIC) 230.

In the example of FIG. 2, the second antenna module 210 also may include multiple subarrays 235, including a fifth subarray 235-a and a sixth subarray 235-b. In this example, the fifth subarray 235-a includes eight antenna elements arranged in a 4×2 array configuration, and the sixth subarray 235-b includes four antenna elements arranged in a 4×1 array configuration. In this case, a single RFIC (RFICS) 240 may be coupled with the subarrays 235, although multiple RFICs may be used or an RFIC may be shared with one or more other of the antenna modules 205 or 215. While the antenna module 210 is illustrated as having multiple subarrays 235 that are different sizes, other examples may have a same number of subarrays 235 with each subarray having a same size (e.g., four 4×4 antenna subarrays similarly as illustrated in the first antenna module 205). Techniques as discussed herein may be applied to any numbers of antenna modules 205 through 215, any numbers of subarrays included in each antenna module, any numbers of antennas per subarray, or any combinations thereof.

As discussed herein, multiple RFICs 230 and associated antenna subarrays 220 may be used at different times by the wireless device. For example, in the case of FIG. 2 where the wireless device is UE 115-a, it may be desirable to operate using a subset of the antenna modules 205-215, using a subset of antenna subarrays 220 and associated RFICs 230, using a subset of antenna elements 225 within one or more subarrays 220, or any combinations thereof. Such operations may allow the UE 115-a to manage power consumption in order to reduce power used by radio frequency (RF) components, for example. In other cases, the UE 115-a may determine, in addition or alternatively to power consumption considerations, that one or more maximum permissible exposure (MPE) limitations, one or more thermal limitations, or combinations thereof, make it desirable to use some groups of antenna elements 225 of one or more subarrays 220. Thus, even though a relatively large number of antenna elements 225 are available at the UE 115-a, not all elements may be used at any particular instant in time.

For example, the UE 115-a may have a total of N antenna elements 225 across each of the different antenna modules 205-215, and may choose K antenna elements 225 for communications, which results in $^{N}C_{K}$ possibilities, which can result in a relatively large number of combinations of different antenna elements 225. Thus, in some cases, the UE 115-a may select a relatively small list of antenna groups that are useful at a given time (e.g., based on power consumption, MPE consideration, thermal considerations, etc.). The UE 115-a may provide an indication of the selected antenna groups to a second wireless device (e.g., a base station), and communications using one of the indicated antenna groups may be established.

Additionally, for some lower frequency ranges (e.g., FR2, such as 24 to 52.6 GHz, or lower frequency ranges), it is sometimes assumed that there is an uplink-downlink beam correspondence. That is, a beam used for downlink communications (modulo some calibration changes) may be reused for uplink communications, so the same or similar beam weights may be used at the different antenna elements 225 of the UE 115-a for both the downlink and for the uplink communications. However, as described herein, for FR4

(e.g., or systems beyond 52.6 GHz), the sets of antennas (e.g., the antenna elements 225) for the downlink communications and for the uplink communications may be different. Accordingly, this asymmetry (e.g., the use of different antenna elements 225 for uplink and for downlink communications) may potentially break the uplink-downlink beam correspondence at the UE 115-a.

To mitigate this issue for the potential beam correspondence failure, a subset of antenna elements 225 used for the downlink communications may be used for the uplink communications. Based on using a subset of the antenna elements 225 for the uplink communications that are taken from a set of antenna elements 225 used for the downlink communications, a QCL relationship may be maintained for the downlink and uplink communications and, thus, may allow for the reuse of a correspondent beam used for the downlink communications on the set of antenna elements 225 to also be used for the subsets of antenna elements 225 used for the uplink communications. However, this mitigation may include the constraint that the antenna elements 225 used for the uplink and downlink communications need to be related.

Additionally or alternatively, when the sets of antenna elements 225 used for the downlink communications and for the uplink communications are different (e.g., with no QCL relationship between them), separate beam training for the downlink communications and for the uplink communications may be performed (e.g., uplink beam training using sounding reference signal (SRS) transmissions and downlink beam training using synchronization signal block (SSB)/CSI-RS transmissions). However, performing the separate beam trainings may consume more time and create more complexity. For example, the signaling overhead may be considered doubled for performing two separate beam training procedures as opposed to a single beam training procedure when uplink-downlink beam correspondence is present and supported.

As described herein, efficient techniques are proposed for performing an efficient beam training for both uplink and downlink communications when different antenna elements, subarrays, and/or arrays are used for the downlink communications and for the uplink communications. For example, a first wireless device (e.g., the UE 115-a, a CPE, or an additional wireless device) may identify a collective antenna array (e.g., aggregate antenna array, anchor antenna array, etc.) that encompasses both the antenna elements used for the uplink communications and for the downlink communications. After transmitting an indication of this collective antenna array to a second wireless device (e.g., a base station 105), the second wireless device and the first wireless device may perform a beam training procedure to identify one or more beams to use for communications based on using the collective antenna array. Subsequently, beam weights used at the antenna elements of the collective antenna array to form the one or more beams may then be used at the antenna elements used for the uplink communications and for the downlink communications. Various examples of indications of the collective antenna array and procedures based on such indications are discussed with reference to FIGS. 3 through 6.

Figure 3:
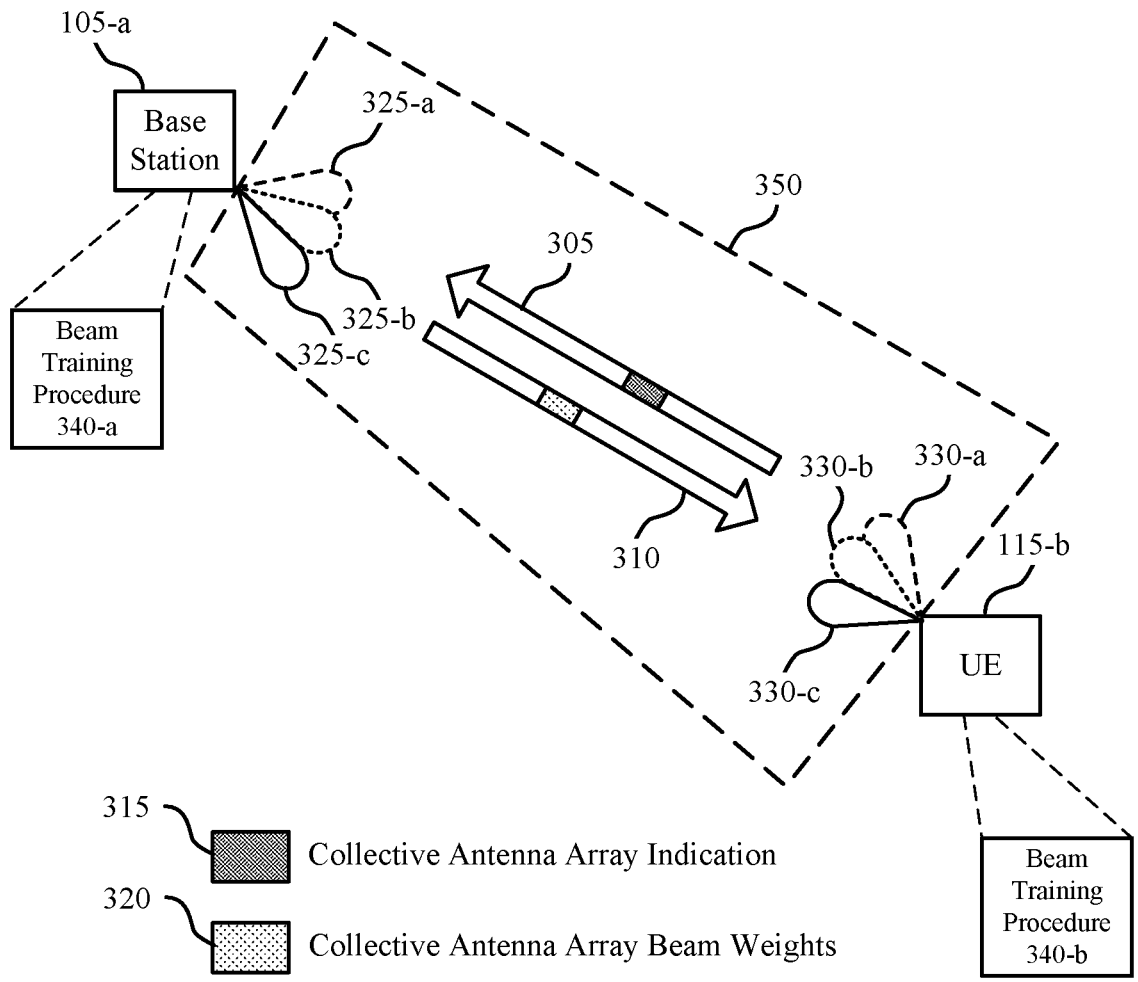
FIG. 3 illustrates an example of a wireless communications system that supports asymmetric uplink-downlink beam training in frequency bands in accordance with one or more aspects of the present disclosure.

FIG. 3 illustrates an example of a wireless communications system 300 that supports asymmetric uplink-downlink beam training in frequency bands in accordance with one or more aspects of the present disclosure. In some examples, wireless communications system 300 may implement aspects of wireless communications system 100. In some examples, the wireless communications system 300 may include a UE 115-b, and a base station 105-a which may be examples of UEs 115 and base stations 105 described with reference to FIGS. 1-2. Further, UE 115-b may be an example of a first wireless device (e.g., a UE 115, a CPE, etc.), and the base station 105-a may be an example of a second wireless device (e.g., a base station 105, a CPE, a relay, a router, a repeater, an IAB node, etc.). The UE 115-b and the base station 105-a may communicate using beamformed communications in which the UE 115-b transmits uplink communications 305 to the base station 105-a, and the base station 105-a transmits downlink communications 310 to the UE 115-b. Additionally, the UE 115-b and the base station 105-a may communicate in the FR4 (e.g., above/beyond 52.6 GHz).

In some cases, the UE 115-b may include a relatively large number of antenna elements, which may be spread across one or more antenna subarrays and one or more antenna modules. Additionally, the UE 115-b may use different sets of antenna elements from the relatively large number of antenna elements for different transmission directions. For example, the UE 115-b may use a first set of antenna elements for receiving downlink communications (e.g., on a first beam) and may use a second set of antenna elements for transmitting uplink communications (e.g., on a second beam). Based on the different sets of antenna elements, no beam correspondence may be present between beams used for receiving the downlink communications (e.g., using the first set of antenna elements) and beams used for transmitting the uplink communications (e.g., using the second set of antenna elements), For example, the UE 115-b may use different uplink and downlink antenna arrays without beam correspondence between uplink and downlink. That is, a same beam or similar beams pointing in a same direction may not be used for both the uplink communications and for the downlink communications (e.g., at the UE 115-b).

In some cases, the base station 105-a and the UE 115-b may perform separate beam training procedures 340-a and 340-b to determine a "best" beam (e.g., a beam with a higher signal quality or strength compared with other potential beams, such as a higher SNR) for the downlink communications and to determine a "best" beam for the uplink communications. For example, as part of the beam training procedures 340-a and 340-b, the base station 105-a and/or the UE 115-b may transmit reference signals that the receiving wireless device measures and uses to determine the "best" beam for the corresponding transmission direction (e.g., based on a measurement report). These reference signals may include, as an example, CSI-RSs transmitted from the base station 105-a to the UE 115-a for a first beam training procedure 340-b to determine a downlink beam for the UE 115-b to use for receiving downlink communications from the base station 105-a, SRSs transmitted from the UE 115-b to the base station 105-a for a second beam training procedure 340-a to determine an uplink beam for the UE 115-b to use for transmitting uplink communications to the base station 105-a, and/or any additional reference signals transmitted by the base station 105-a and/or the UE 115-b.

Subsequently, after receiving the reference signals, the receiving wireless device may measure the reference signals and transmit the measurements (e.g., signal quality, signal strength, SNR, signal-to-interference-plus-noise ratio (SINR), etc.) to the wireless device that transmitted the reference signals. In some cases, the receiving device may measure the reference signals against expected parameters for the reference signals (e.g., the reference signals may correspond to known parameters known to the wireless devices in wireless communications system 300) and report the delta of the expected parameters and the parameters of the received reference signals.

Accordingly, for the beam training procedure 340 to determine the "best" beam for the downlink communications, the base station 105-*a* may receive measurement reports from the UE 115-*b*, determine the "best" beam for the UE 115-*b* to use for receiving subsequent downlink communications from the base station 105-*a* based on the received measurement reports, and transmit an indication of this "best" beam to the UE 115-*b*. Additionally or alternatively, for the beam training procedure 340 to determine the "best" beam for the uplink communications, the base station 105-*a* may measure the received reference signals from the UE 115-*b*, determine the "best" beam for the UE 115-*b* to use for transmitting subsequent uplink communications to the base station 105-*a* based on the measurements performed by the base station 105-*a*, and transmit an indication of this "best" beam to the UE 115-*b*. In some cases, the base station 105-*a* may transmit measurement reports for the measurements of the received uplink reference signals, and the UE 115-*b* may determine the "best" beam to use for the subsequent uplink communications based on the measurement reports.

The separate beam training procedures 340-*a* and 340-*b* and identifying the corresponding "best" beams for the downlink communications and the uplink communications may include identifying and applying amplitude and phase beam weights to the different antenna elements of the wireless device (e.g., the UE 115-*b*). For example, the amplitude and phase beam weights may include different power levels at each antenna elements (e.g., amplitude beam weights), angles/directions for the antenna elements to aim their transmission (e.g., phase beam weights), etc., such that each antenna element may include individual beam weights specific to that antenna element. Subsequently, based on the amplitude and phase beam weights, the wireless device may form the corresponding "best" beams. That is, the UE 115-*b* may apply a first set of determined beam weights to the first set of antenna elements to form a first "best" beam for the downlink communications and may apply a second set of determined beam weights to the second set of antenna elements to form a second "best" beam for the uplink communications (e.g., the first and second "best" beams may be the same or different).

Based on performing the separate beam training procedures 340-*a* and 340-*b*, signaling overhead may increase to determine the two "best" beams for the downlink communications and the uplink communications (e.g., even if a same "best" beam is determined for both the downlink and uplink communications). based on signaling the measurement reports, indications of the "best" beams to use, etc. for both beam training procedures 340. Accordingly, more efficient techniques (e.g., less signaling overhead) are desired for performing beam training procedures when a set of antenna elements used for downlink communications (e.g., the first set of antenna elements) differs from a set of antenna elements used the uplink communications (e.g., the second set of antenna elements).

As described herein, instead of separately training uplink and downlink specific sets of antenna elements (e.g., uplink and downlink antenna arrays), the UE 115-*b* may define and determine a collective antenna array (e.g., an anchor antenna array) that consists of common sets of antenna elements for the uplink and downlink communications. For example, the collective antenna array may be large enough to encompass the first set of antenna elements used for the downlink communications and the second set of antenna elements used for the uplink communications (e.g., the downlink and uplink antenna arrays). In some cases, the collective antenna array may be a regular/planar configuration (if possible) and may be a superset of antenna elements in the first and second sets of antenna elements. The UE 115-*b* may transmit a collective antenna array indication 315 (e.g., an indication of the determined collective antenna array) to the base station 105-*a* as part of the uplink communications 305. Additionally, the base station 105-*a* may utilize coordination and signaling for the setup of the collective antenna array at the UE 115-*b*.

In some cases, the first set of antenna elements for the downlink communications and/or the second set of antenna elements for the uplink communications may change for the UE 115-*b*. For example, additional sets of antenna elements may be used, different antenna elements may be used, etc., which may change with time. Accordingly, coordinated changes of the collective antenna array at the UE 115-*b* (with time) may be signaled as the necessary sets of antenna elements for the downlink and uplink communications (e.g., uplink/downlink antenna array) change. For example, the UE 115-*b* may change the collective antenna array dynamically and may coordinate this change with the base station 105-*a*.

Subsequently, the UE 115-*b* and the base station 105-*a* may then perform a beam training procedure 350 on the collective antenna array to identify a "best" beam for the downlink communications and may use the obtained "best" beam as a beam correspondent for the uplink communications. For example, the identified "best" beam for the downlink communications may correspond to a beam for the uplink communications (e.g., using a QCL relationship between the two beams such that, for example, the two beams are pointed in a same or similar direction). In some cases, special (e.g., aperiodic) beam training signals may be used for a correspondent beam estimation with the collective antenna array as part of the beam training procedure 350, where the aperiodic signals are allocated and configured by the base station 105-*a* for use with the collective antenna array.

That is, the base station 105-*a* may initiate one or more procedures based on the collective antenna array indication 315, such as a beam training procedure 350 based on the indicated collective antenna array (e.g., using the aperiodic beam training signals), where different base station beams 325 and different UE beams 330 may be tested and measured to identify a preferred beam for communications (e.g., a "best" beam). For example, the UE 115-*b* may measure reference signals of multiple base station beams 325 using multiple UE beams 330, select a preferred beam, and provide feedback to the base station 105-*a* on the selected beam, such as through a chosen transmission configuration indication (TCI) state. In some cases, the UE 115-*b* may transmit a CSI measurement report to the base station 105-*a* based on measurements of the beam training procedure 350. Further, in some cases, the UE 115-*b* may transmit the one or more transmission control parameters associated with the selected beam (e.g., an array size of one or more groups/sets of antenna elements, an array geometry of the one or more sets of antenna elements, a beam pattern of the one or more sets of antenna elements, or any combinations thereof) and associated group of antenna elements once the preferred beam has been selected, which may then be used by the base station 105-*a* for allocating resources to the UE 115-*b*, scheduling communications for the UE 115-*b*, setting a digital beamforming codebook, setting one or more power control parameters, or any combinations thereof.

In some cases, the UE 115-*b* may use subsets of beam weights (e.g., amplitude and phase beam weights) determined from a full set of beam weights identified for the "best" beam from the downlink portion of the beam training procedure 350 for the collective antenna array as beam weights (modulo calibration) for the sets of antenna elements used for the downlink and the uplink communications at the UE 115-*b*. For example, the downlink portion of the beam training procedure 350 may identify a set of beam weights for each of the antenna elements in the collective antenna array to form the "best" beam determined by the downlink portion of the beam training procedure 350. Subsequently, the base station 105-*a* may transmit an indication of collective antenna array beam weights 320 (e.g., the determined beam weights for all of the antenna elements of the collective antenna array) to the UE 115-*b* as part of the downlink communications 310. Accordingly, the UE 115-*b* may then use a subset of beam weights (e.g., from the set of beam weights for each of the antenna elements in the collective antenna array) corresponding to the specific antenna elements that are used for the downlink communications (e.g., the first set of antenna elements) and a subset of beam weights corresponding to the specific antenna elements that are used for the uplink communications (e.g., the second set of antenna elements).

In some cases, a calibration (e.g., modulo calibration) may be applied to the subsets of beam weights to adjust the beam weights indicated for the collective antenna array. These calibrated/adjusted beam weights may then be applied to the first set of antenna elements and the second set of antenna elements to form corresponding beams for the downlink communications and the uplink communications, respectively.

Based on using the subsets of beam weights from a same set of beam weights, the beams used for the downlink communications and for the uplink communications may point in a same or similar direction. Additionally, based on using subsets of the determined beam weights from a single beam training procedure 350 for both the first set of antenna elements and the second set of antenna elements, signaling overhead may be reduced for determining beams and beam weights specific to each set of antenna elements for both downlink and uplink communications. Accordingly, the UE 115-*b* may form a collective antenna array (e.g., an anchor antenna array) that allows beam weight estimation for the first and second sets of antenna elements (e.g., downlink and uplink antenna arrays), where the first and second sets of antenna elements have no beam correspondence between uplink and downlink.

Additionally, in some cases, certain subsets of antennas of the collective antenna array may need beam refinement. As such, if necessary, beam refinement may be performed for the subsets of antennas (e.g., uplink/downlink antenna array) using the beam weights of the collective antenna array as a starting point. For example, the base station 105-*a* may assist the UE 115-*b* in making an estimation of whether some subsets of antennas for the uplink communications and/or for the downlink communications need beam refinement. Subsequently, the base station 105-*a* may then help the UE 115-*b* with beam refinement via beam training (e.g., additional beam training procedures).

Figure 4:
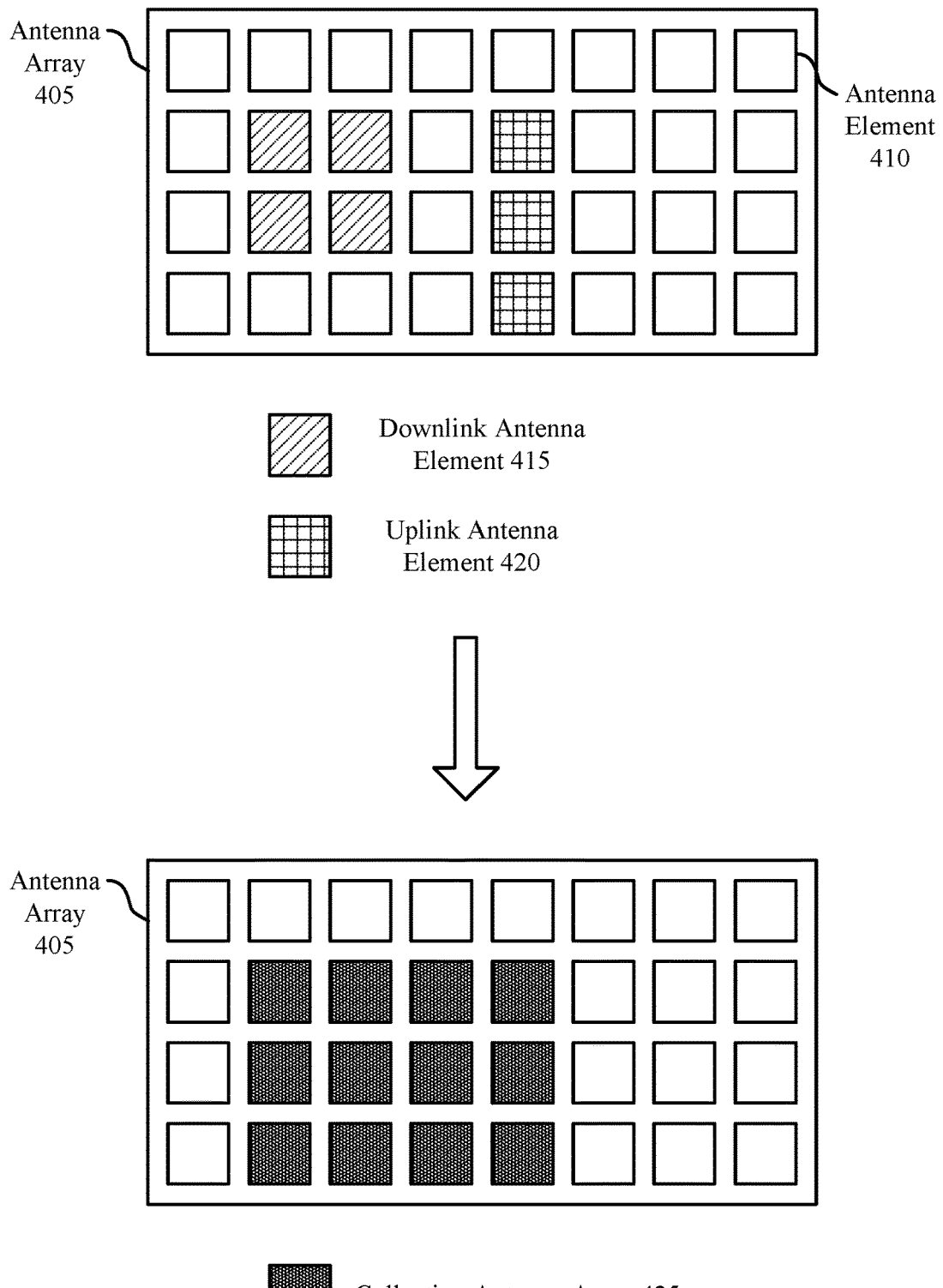
FIGS. 4 and 5 illustrate examples of collective antenna arrays that support asymmetric uplink-downlink beam training in frequency bands in accordance with one or more aspects of the present disclosure.

FIG. 4 illustrates an example of a collective antenna configuration 400 that supports asymmetric uplink-downlink beam training in frequency bands in accordance with one or more aspects of the present disclosure. In some examples, collective antenna configuration 400 may implement aspects of wireless communications systems 100 and/ or 300. As described herein with reference to FIG. 3, a first wireless device may determine and use the collective antenna configuration 400 to communicate with a second wireless device. In this example, the first wireless communication device may be a UE 115 and the second wireless device may be a base station 105, although in other cases the wireless communication devices may be different devices, such as a CPE, a relay device, a router, a repeater, or an IAB node.

As shown, the first wireless device may include an antenna array 405 that includes multiple antenna elements 410. For example, the antenna array 405 may be an 8×4 antenna array that includes eight (8) columns of the antenna elements 410 and four (4) rows of the antenna elements 410 (e.g., for a total of 32 antenna elements 410). Accordingly, the antenna array 405 and the corresponding antenna elements 410 may be available at the first wireless device for transmission of downlink communications and uplink communications.

In some cases, and for the example shown for FIG. 3, the first wireless device may identify and use a first antenna subarray for the downlink communications that includes a 2×2 antenna array (e.g., subarray) of four (4) downlink antenna elements 415 (e.g., a first set of antenna elements 410 for the downlink communications). Additionally, the first wireless device may identify and use a second antenna subarray for the uplink communications that includes a 3×1 antenna array (e.g., subarray) of three (3) uplink antenna elements 420 (e.g., a second set of antenna elements 410 for the uplink communications). The downlink antenna elements 415 may not subsume the uplink antenna elements 420, and the uplink antenna elements 420 may not subsume the downlink antenna elements 415 (e.g., neither the downlink antenna elements 415 nor the uplink antenna elements 420 are a subset of the other set of antenna elements). In some cases, the second wireless device may indicate to the first wireless device which antenna elements 410 to use for the respective downlink and uplink communications. Additionally or alternatively, the first wireless device may determine which antenna elements 410 to use for the respective downlink and uplink communications without an indication from the second wireless device.

As described herein, the first antenna subarray and the second antenna subarray may not include a beam correspondence (e.g., QCL relationship, using a same or similar beam for both the downlink communications and the uplink communications, etc.). Accordingly, to identify beams to use for communicating with the second wireless device on the downlink antenna elements 415 and the uplink antenna elements 420, the first wireless device may identify a collective antenna array 425 (e.g., an anchor antenna array, an aggregate antenna array, etc.) in the antenna array 405 that encompasses at least both the downlink antenna elements 415 and the uplink antenna elements 420. The collective antenna array 425 may include a 3×4 antenna array that includes the downlink antenna elements 415, the uplink antenna elements 420, and additional antenna elements 410 not used for the downlink or uplink communications. In some cases, the collective antenna array 425 may be a largest regular and/or planar superset of the downlink antenna elements 415 and the uplink antenna elements 420. As such, the first wireless device may form the collective antenna array 425 and then may signal the usage of this collective antenna array 425 to the second wireless device as part of a beam training procedure.

Subsequently, the second wireless device (e.g., and the first wireless device) may perform the beam training procedure and may help the first wireless device in forming beam weights for use with the collective antenna array 425 (e.g., beam weights for each of the antenna elements 410 of the collective antenna array 425 to form a "best" beam for receiving downlink communications from the second wireless device). Accordingly, from that information of the beam weights for the collective antenna array 425, the first wireless device may find an estimate of beam weights to be used for the 2×2 antenna subarray of the downlink antenna elements 415 (e.g., downlink subarray, downlink array, etc.) and the 3×1 antenna subarray of the uplink antenna elements 420 (e.g., uplink subarray, uplink array, etc.).

For example, $w_{ij}$ may denote the beam weights learned from the beam training procedure for the antenna elements 410 of the collective antenna array 425, where i=1, 2, 3 and j=1, 2, 3, 4 to represent individual beam weights for each of the antenna elements 410 of the collective antenna array 425. That is, $w_{11}$ may represent the top left antenna element 410 of the collective antenna array 425 (e.g., first row and first column), $w_{12}$ may represent the second antenna element 410 from the left on the top row of the collective antenna array 425 (e.g., first row and second column), $w_{21}$ may represent the first antenna element 410 from the left on the second row of the collective antenna array 425 (e.g., second row and first column), etc., up to $w_{34}$ that may represent the bottom right antenna element 410 of the collective antenna array 425 (e.g., third row and fourth column).

Accordingly, a subset of the beam weights may be used for the respective downlink antenna elements 415 and uplink antenna elements 420. For example, for the downlink antenna elements 415, $w_{ij}$, where i=1, 2 and j=1, 2, may be used for the downlink antenna elements 415 and, for the uplink antenna elements 420, $w_{ij}$, where i=1, 2, 3 and j=4, may be used for the uplink antenna elements 420. In some cases, calibration adjustments (e.g., modulo calibration) may be made to the beam weights from the collective antenna array 425 to be used for the specific downlink antenna elements 415 and uplink antenna elements 420. After determining the individual beam weights to use for the downlink antenna elements 415 and for the uplink antenna elements 420 from the full set of beam weights for the collective antenna array 425, the first wireless device may then communicate with the second wireless device on beams formed as a result of the determined individual beam weights.

Figure 5:
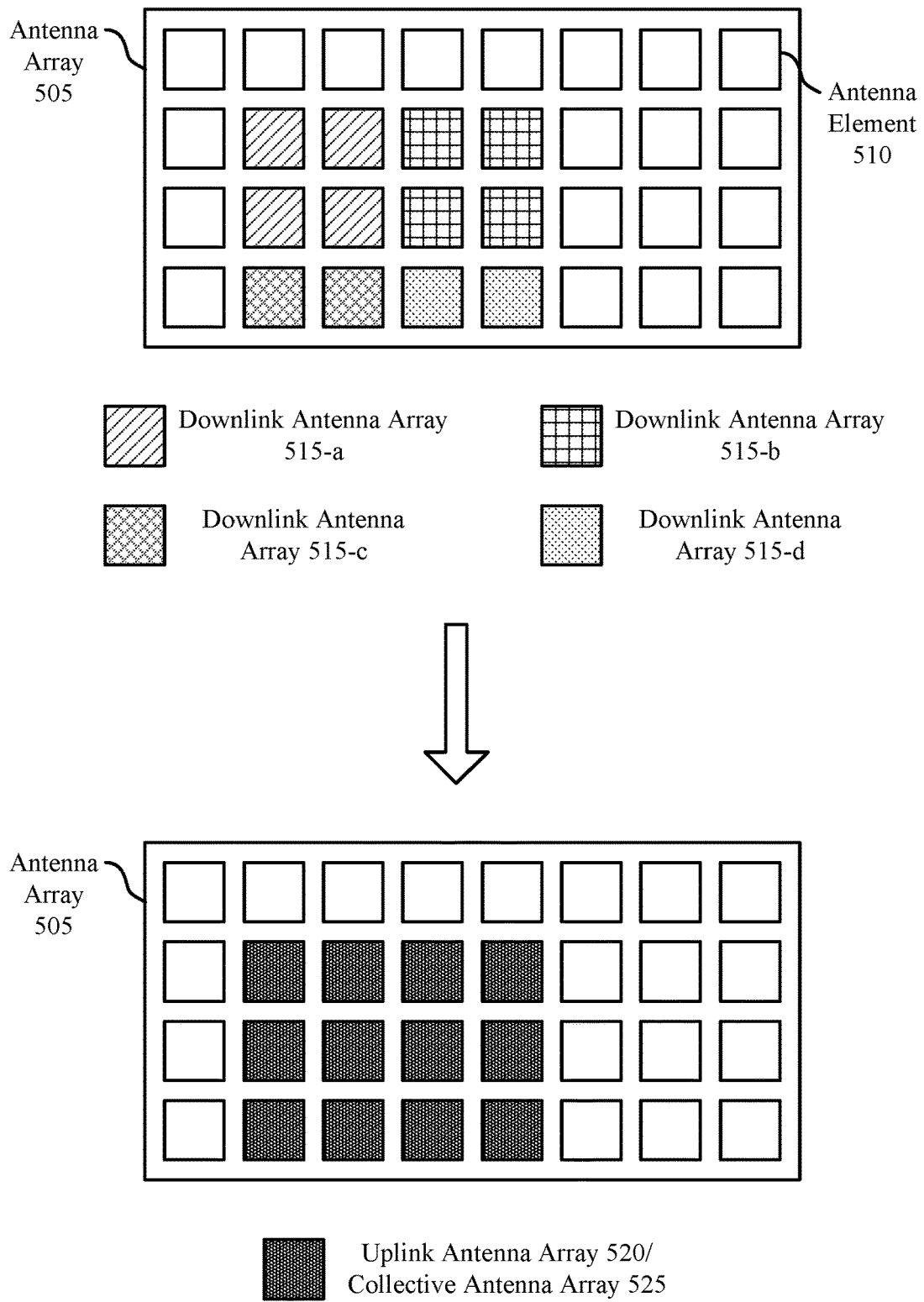

FIG. 5 illustrates an example of a collective antenna configuration 500 that supports asymmetric uplink-downlink beam training in frequency bands in accordance with one or more aspects of the present disclosure. In some examples, collective antenna configuration 500 may implement aspects of wireless communications systems 100 and/or 300. As described herein with reference to FIGS. 3 and 4, a first wireless device may determine and use the collective antenna configuration 400 to communicate with a second wireless device. In this example, the first wireless communication device may be a UE 115 and the second wireless device may be a base station 105, although in other cases the wireless communication devices may be different devices, such as a CPE, a relay device, a router, a repeater, or an IAB node.

Similar to the example shown with respect to FIG. 4, the first wireless device may include an antenna array 505 that includes multiple antenna elements 510. For example, the antenna array 505 may be an 8×4 antenna array that includes eight (8) columns of the antenna elements 510 and four (4) rows of the antenna elements 510 (e.g., for a total of 32 antenna elements 510). Accordingly, the antenna array 505 and the corresponding antenna elements 510 may be available at the first wireless device for transmission of downlink communications and uplink communications.

In some cases, the first wireless device may dynamically use multiple 2×2 and 2×1 antenna subarrays of the antenna array 505 for downlink communications with the second wireless device. For example, a first downlink antenna array 515-a may be a 2×2 antenna subarray as shown, a second downlink antenna array 515-b may also be a 2×2 antenna subarray, a third downlink antenna array 515-c may be a 2×1 antenna subarray, and a fourth downlink antenna array 515-d may also be a 2×1 antenna subarray. The first wireless device may switch between the downlink antenna arrays on a per symbol basis (e.g., or any length TTI), such that the first downlink antenna array 515-a is used for a first symbol, the second downlink antenna array 515-b is used for a second symbol, etc. The order that the first wireless device uses the downlink antenna arrays 515 may vary and may be determined by the first wireless device. Additionally or alternatively, the second wireless device may indicate which downlink antenna array 515 the first wireless device is to use for which symbol (e.g., or TTI).

Subsequently, the first wireless device may then determine an uplink antenna array 520 for communicating with the second wireless device. In some cases, the uplink antenna array 520 may be the union of all the downlink antenna arrays 515. Additionally, the uplink antenna array 520 may serve as a collective antenna array 525 as described herein, where the uplink antenna array 520 is a superset of all downlink antenna arrays 515.

In some cases, performing a beam training procedure over the uplink antenna array 520/the collective antenna array 525 may be time-consuming and power consuming (e.g., based on using a higher number of antenna elements 510). Accordingly, the first wireless device may run through all the distinct downlink antenna arrays 515 (e.g., the first downlink antenna array 515-a, the second downlink antenna array 515-b, the third downlink antenna array 515-c, and the fourth downlink antenna array 515-d) for beam training while the second wireless device runs through beams on its end. Since all the downlink antenna arrays 515 see similar clusters in the channel (e.g., pointed along similar directions), the first wireless device may accumulate the beam weights of all the downlink antenna arrays 515 to generate beam weights for the uplink antenna array 520 (e.g., with modulo calibration constraints and phase relationship across the downlink antenna arrays 515). Additionally, this beam training procedure can be done in a TDM manner.

Figure 6:
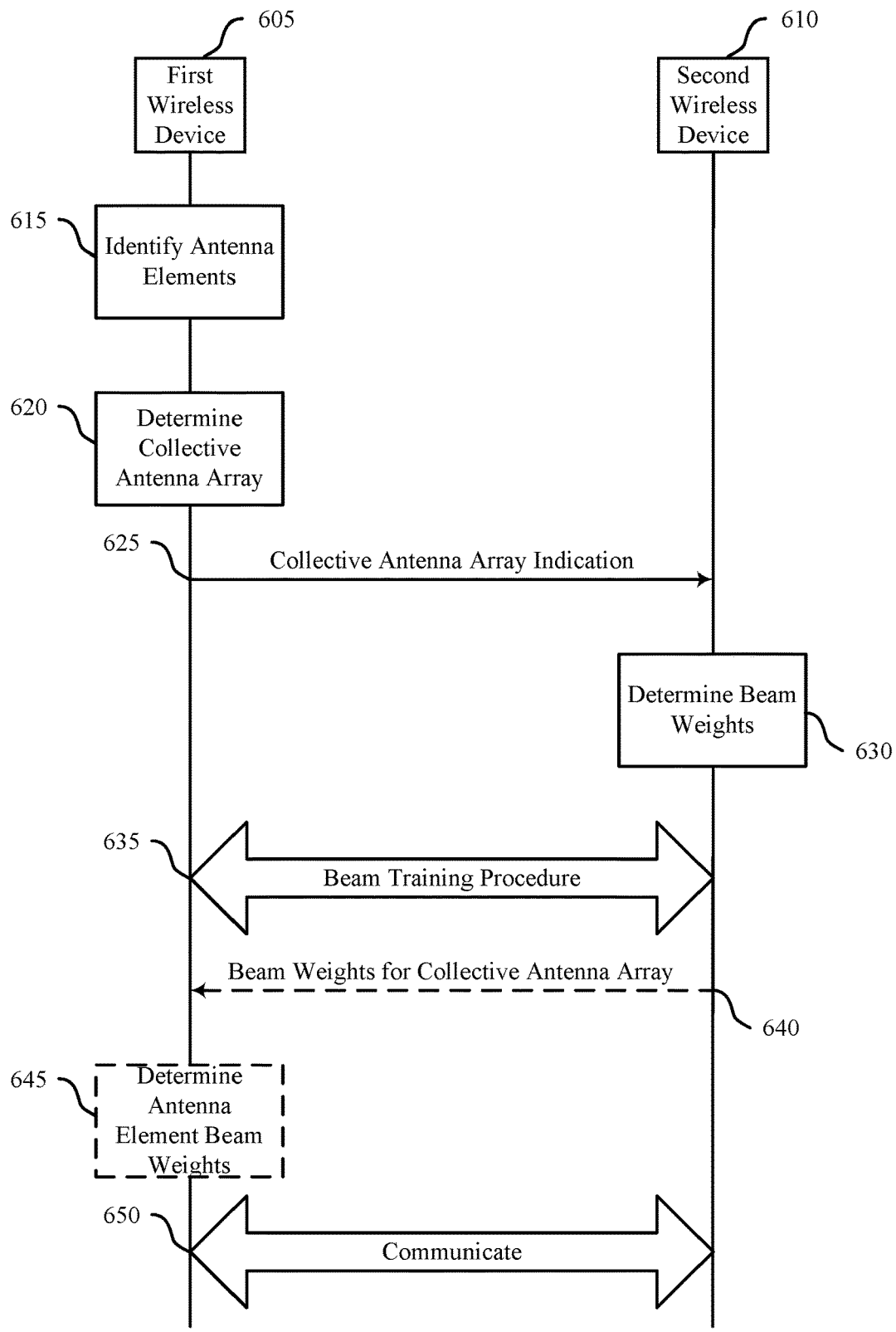
FIG. 6 illustrates an example of a process flow that supports asymmetric uplink-downlink beam training in frequency bands in accordance with one or more aspects of the present disclosure.

FIG. 6 illustrates an example of a process flow 600 that supports asymmetric uplink-downlink beam training in frequency bands in accordance with one or more aspects of the present disclosure. In some examples, process flow 600 may implement aspects of wireless communications systems 100 and/or 300. Process flow 600 may be implemented by first wireless device 605 and a second wireless device 610 as described herein. Alternative examples of the following may be implemented, where some steps are performed in a different order than described or are not performed at all. In some cases, steps may include additional features not mentioned below, or further steps may be added.

At 615, the first wireless device 605 may identify a first set of antenna elements for downlink communications with the second wireless device 610 and a second set of antenna elements for uplink communications with the second wireless device 610. Additionally, the first set of antenna elements may be different from the second set of antenna elements. In some cases, the first set of antenna elements may not subsume the second set of antenna elements nor the second set of antenna elements may subsume the first set of antenna elements. Additionally, the first wireless device may be a UE 115 or a CPE in a wireless communications system, and the second wireless device may be a base station 105, a CPE, a relay device, a router, a repeater, or an IAB node in the wireless communications system.

At 620, the first wireless device 605 may determine a collective antenna array that includes at least the first set of antenna elements and the second set of antenna elements. For example, the collective antenna array may be a planar antenna array encompassing at least both the first set of antenna elements and the second set of antenna elements.

At 625, the first wireless device 605 may transmit, to the second wireless device 610, an indication of the collective antenna array. In some cases, the first wireless device 605 may adjust the collective antenna array based on the first set of antenna elements changing, the second set of antenna elements changing, or both. Subsequently, the first wireless device 605 may transmit, to the second wireless device 610, an indication of the adjusted collective antenna array.

At 630, the second wireless device 610 may determine a set of beam weights for the collective antenna array based on a beam training procedure.

At 635, the first wireless device 605 and the second wireless device 610 may perform a beam training procedure for the collective antenna array. For example, the first wireless device 605 may receive, from the second wireless device 610, one or more aperiodic training signals for use with the collective antenna array as part of the beam training procedure. Subsequently, or concurrently as part of full-duplex operations, the first wireless device 605 may transmit, to the second wireless device 610, one or more measurement reports corresponding to the received aperiodic training signals. Additionally, the first wireless device 605 may receive, from the second wireless device 610, an indication of a downlink receive beam based on the one or more measurement reports. Subsequently, or concurrently as part of full-duplex operations, in some cases, the indication of the collective antenna array may be transmitted to the second wireless device 610 as part of the beam training procedure.

As part of the beam training procedure, the second wireless device 610 may determine a downlink receive beam for the first set of antenna elements based on the beam training procedure for the collective antenna array and may transmit, to the first wireless device 605, an indication of the downlink receive beam for the first wireless device 605 to use for the downlink communications. Additionally, in some cases, the second wireless device 610 may determine one or more aperiodic training signals to transmit to the first wireless device 605 as part of the beam training procedure. Subsequently, the second wireless device 610 may transmit, to the first wireless device 605, the one or more aperiodic training signals for use with the collective antenna array as part of the beam training procedure and may receive, from the first wireless device 605, one or more measurement reports corresponding to the transmitted aperiodic training signals, where the downlink receive beam is determined based on the one or more measurement reports.

At 640, the first wireless device 605 may receive, from the second wireless device 610, a set of amplitude and phase beam weights for each antenna element in the collective antenna array.

At 645, the first wireless device 605 may determine a first subset of beam weights for the first set of antenna elements and a second subset of beam weights for the second set of antenna elements, where the first subset of beam weights and the second subset of beam weights are based on the set of beam weights for the collective antenna array. For example, the first wireless device 605 may determine a first set of beam weights for the first set of antenna elements and a second set of beam weights for the second set of antenna elements based on the beam training procedure for the collective antenna array.

In some cases, the first wireless device 605 may receive, from the second wireless device 610, an indication of a downlink receive beam based on the indication of the collective antenna array and may determine an uplink transmit beam to communicate with the second wireless device 610 based on the indication of the downlink receive beam. For example, the downlink receive beam and the uplink transmit beam may include a beam correspondence pair, a QCL beam pair, or a combination thereof.

Additionally or alternatively, the first wireless device 605 may identify multiple sets of antenna elements for the downlink communications with the second wireless device 610, where the second set of antenna elements may include the multiple sets of antenna elements. For example, each set of antenna elements of the multiple sets of antenna elements may be used for the downlink communications with the second wireless device 610 for different time symbols. Accordingly, the first wireless device 605 and the second wireless device 610 may perform a beam training procedure for each set of antenna elements of the multiple sets of antenna elements and may receive, from the second wireless device 610, a first set of beam weights for the multiple sets of antenna elements based on the beam training procedure. Subsequently, the first wireless device 605 may generate a second set of beam weights for the second set of antenna elements based on the first set of beam weights. In some cases, the beam training procedure may be performed according to TDM. Additionally, the collective antenna array may be the second set of antenna elements.

At 650, the first wireless device 605 may communicate with the second wireless device 610 via a mmW frequency band based on the collective antenna array. In some cases, the mmW frequency band may include frequencies that are greater than 52.6 GHz.

Additionally, in some cases, the second wireless device 610 may determine the first set of antenna elements, the second set of antenna elements, or both need a beam refinement. Accordingly, the second wireless device 610 (e.g., and the first wireless device 605) may perform a beam refinement procedure based on the determination.

Figure 7:
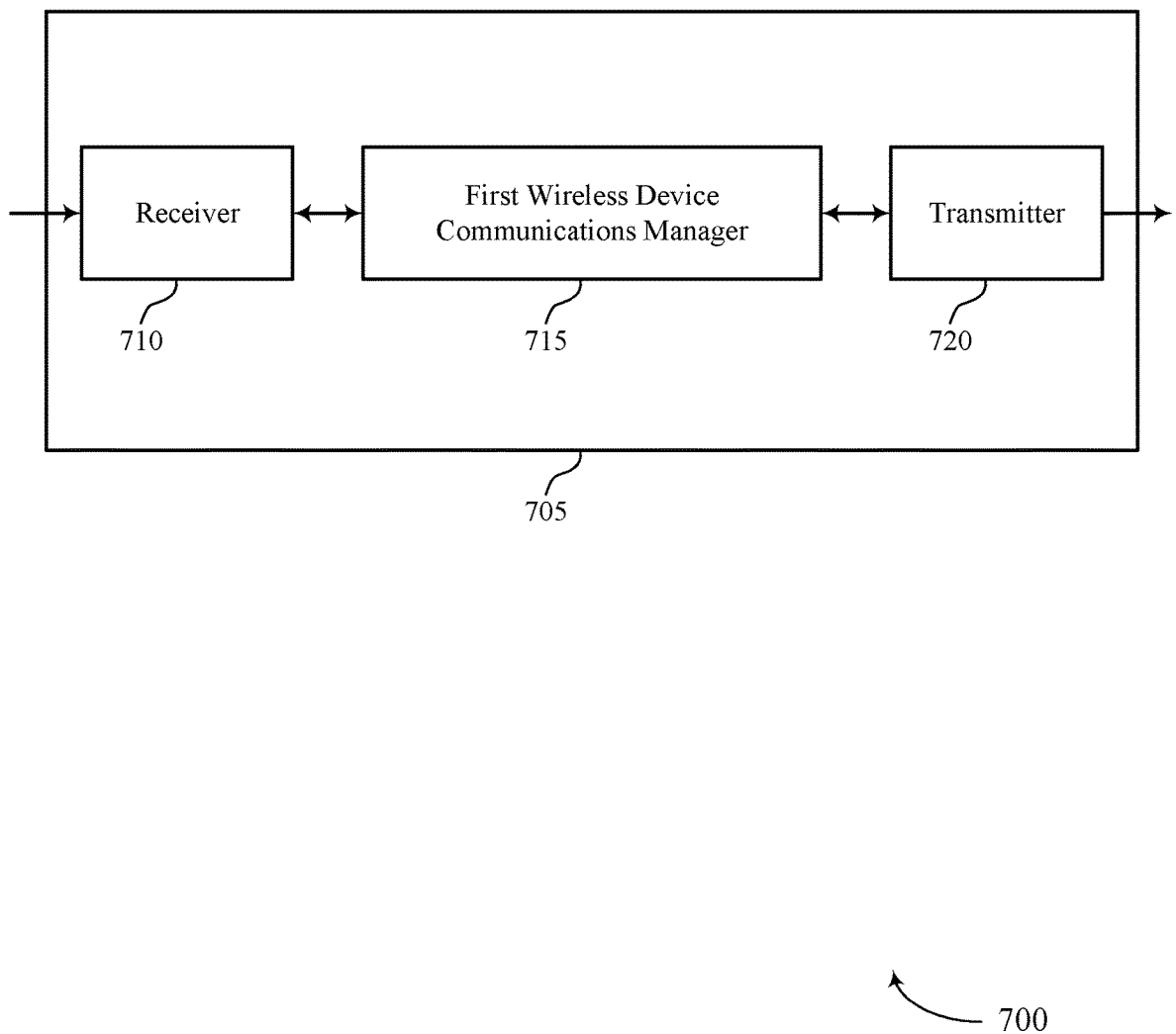
FIGS. 7 and 8 show block diagrams of devices that support asymmetric uplink-downlink beam training in frequency bands in accordance with one or more aspects of the present disclosure.

FIG. 7 shows a block diagram 700 of a device 705 that supports asymmetric uplink-downlink beam training in frequency bands in accordance with one or more aspects of the present disclosure. The device 705 may be an example of aspects of a first wireless device (e.g., a UE 115, a CPE, etc.) as described herein. The device 705 may include a receiver 710, a first wireless device communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to asymmetric uplink-downlink beam training in frequency bands, etc.). Information may be passed on to other components of the device 705. The receiver 710 may be an example of aspects of the transceiver 1020 described with reference to FIG. 10. The receiver 710 may utilize a single antenna or a set of antennas.

The first wireless device communications manager 715 may transmit, to a second wireless device, an indication of a collective antenna array including at least a first set of antenna elements for downlink communications with the second wireless device and a second set of antenna elements for uplink communications with the second wireless device, the first set of antenna elements being different from the second set of antenna elements. Subsequently, the first wireless device communications manager 715 may receive, from the second wireless device, a set of amplitude and phase beam weights for each antenna element in the collective antenna array. Additionally, the first wireless device communications manager 715 may communicate with the second wireless device based on the collective antenna array. The first wireless device communications manager 715 may be an example of aspects of the first wireless device communications manager 1010 described herein.

In some examples, the first wireless device communications manager 715 as described herein may be implemented to realize one or more potential advantages. For example, by determining the collective antenna array, the first wireless device communications manager 715 may reduce signaling overhead to determine respective beams for the first set of antenna elements for the downlink communications with the second wireless device and the second set of antenna elements for uplink communications with the second wireless device. That is, the first wireless device communications manager 715 may perform a single beam training procedure to determine beams for both the first set of antenna elements and the second set of antenna elements. As such, the first wireless device may reduce power consumption by performing the single beam training procedure with the collective antenna array.

The first wireless device communications manager 715 may be an example of means for performing various aspects of uplink-downlink beam training. The first wireless device communications manager 715, or its sub-components, may be implemented in hardware (e.g., in communications management circuitry). The circuitry may include of processor, digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

In another implementation, the first wireless device communications manager 715, or its sub-components, may be implemented in code (e.g., as communications management software or firmware) executed by a processor, or any combination thereof. If implemented in code executed by a processor, the functions of the first wireless device communications manager 715, or its sub-components may be executed by a general-purpose processor, a DSP, an ASIC, an FPGA or other programmable logic device.

The first wireless device communications manager 715, or its sub-components, may be physically located at various positions, including being distributed such that portions of functions are implemented at different physical locations by one or more physical components. In some examples, the first wireless device communications manager 715, or its sub-components, may be a separate and distinct component in accordance with various aspects of the present disclosure. In some examples, the first wireless device communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

In some examples, the first wireless device communications manager 715 may be configured to perform various operations (e.g., receiving, transmitting, communicating performing) using or otherwise in cooperation with the receiver 710, the transmitter 720, or both.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
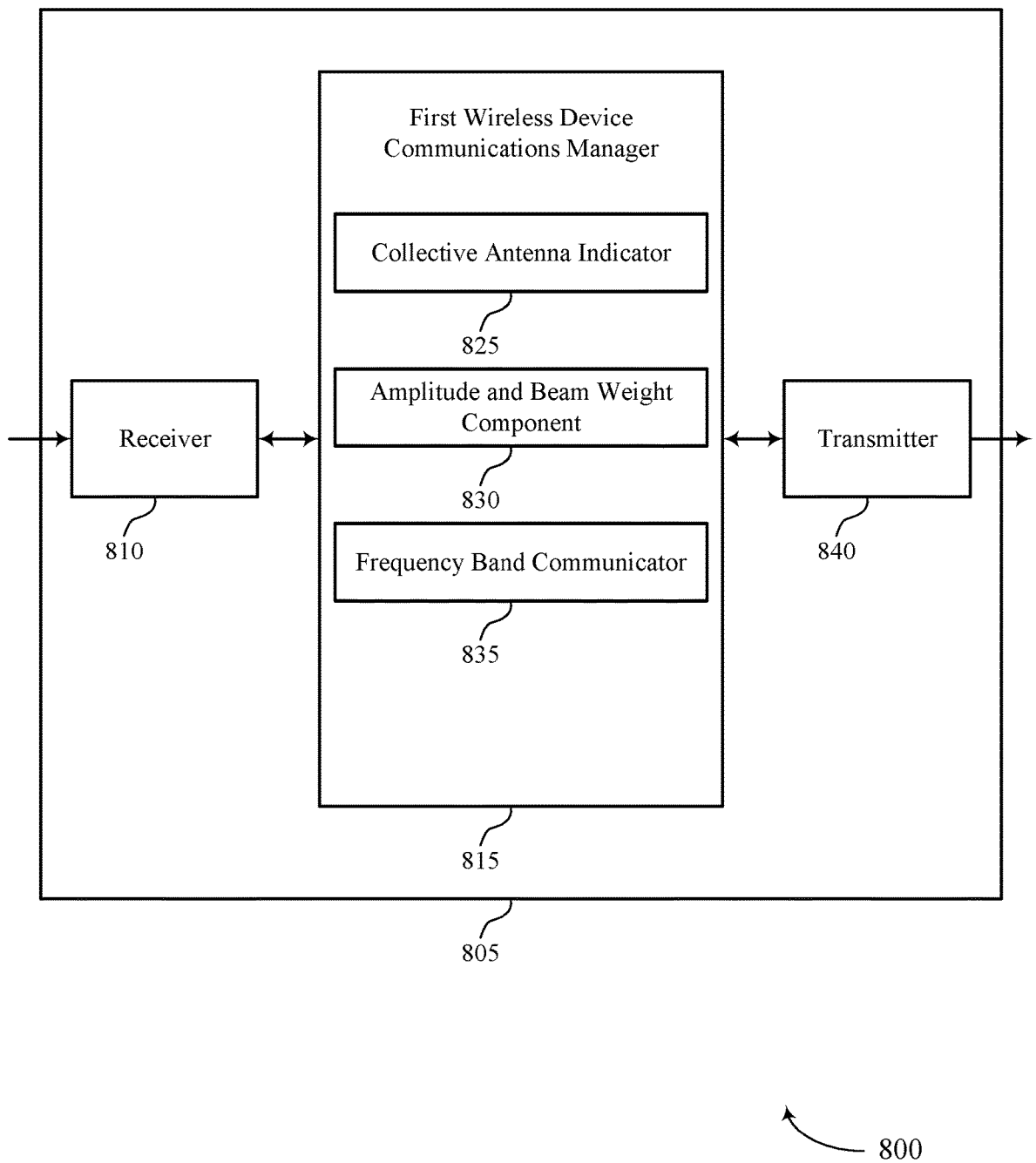

FIG. 8 shows a block diagram 800 of a device 805 that supports asymmetric uplink-downlink beam training in frequency bands in accordance with one or more aspects of the present disclosure. The device 805 may be an example of aspects of a device 705 or a first wireless device (e.g., a UE 115, a CPE, etc.) as described herein. The device 805 may include a receiver 810, a first wireless device communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to asymmetric uplink-downlink beam training in frequency bands, etc.). Information may be passed on to other components of the device 805. The receiver 810 may be an example of aspects of the transceiver 1020 described with reference to FIG. 10. The receiver 810 may utilize a single antenna or a set of antennas.

The first wireless device communications manager 815 may be an example of aspects of the first wireless device communications manager 715 as described herein. The first wireless device communications manager 815 may include a collective antenna indicator 825, an amplitude and beam weight component 830, and a frequency band communicator 835. The first wireless device communications manager 815 may be an example of aspects of the first wireless device communications manager 1010 described herein.

The collective antenna indicator 825 may transmit, to a second wireless device, an indication of a collective antenna array including at least a first set of antenna elements for downlink communications with the second wireless device and a second set of antenna elements for uplink communications with the second wireless device, the first set of antenna elements being different from the second set of antenna elements.

The amplitude and beam weight component 830 may receive, from the second wireless device, a set of amplitude and phase beam weights for each antenna element in the collective antenna array.

The frequency band communicator 835 may communicate with the second wireless device based on the collective antenna array.

Based on techniques for determining the collective antenna array, a processor of the first wireless device (e.g., controlling the receiver 810, the transmitter 840, or the transceiver 1020 as described with reference to FIG. 10) may decrease latency and signaling overhead that would result from performing separate beam training procedures for the first set of antenna elements and for the second set of antenna elements. Additionally, the processor may enable the UE 115 to save power by reducing the amount of signaling and processing from the multiple beam training procedures. For example, a single beam training procedure may be performed to identify a downlink receive beam corresponding to the collective antenna array that then can lead to identifying an uplink transmit beam related to the downlink receive beam, thereby reducing signaling needed to identify the downlink receive beam and the uplink transmit beam separately.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
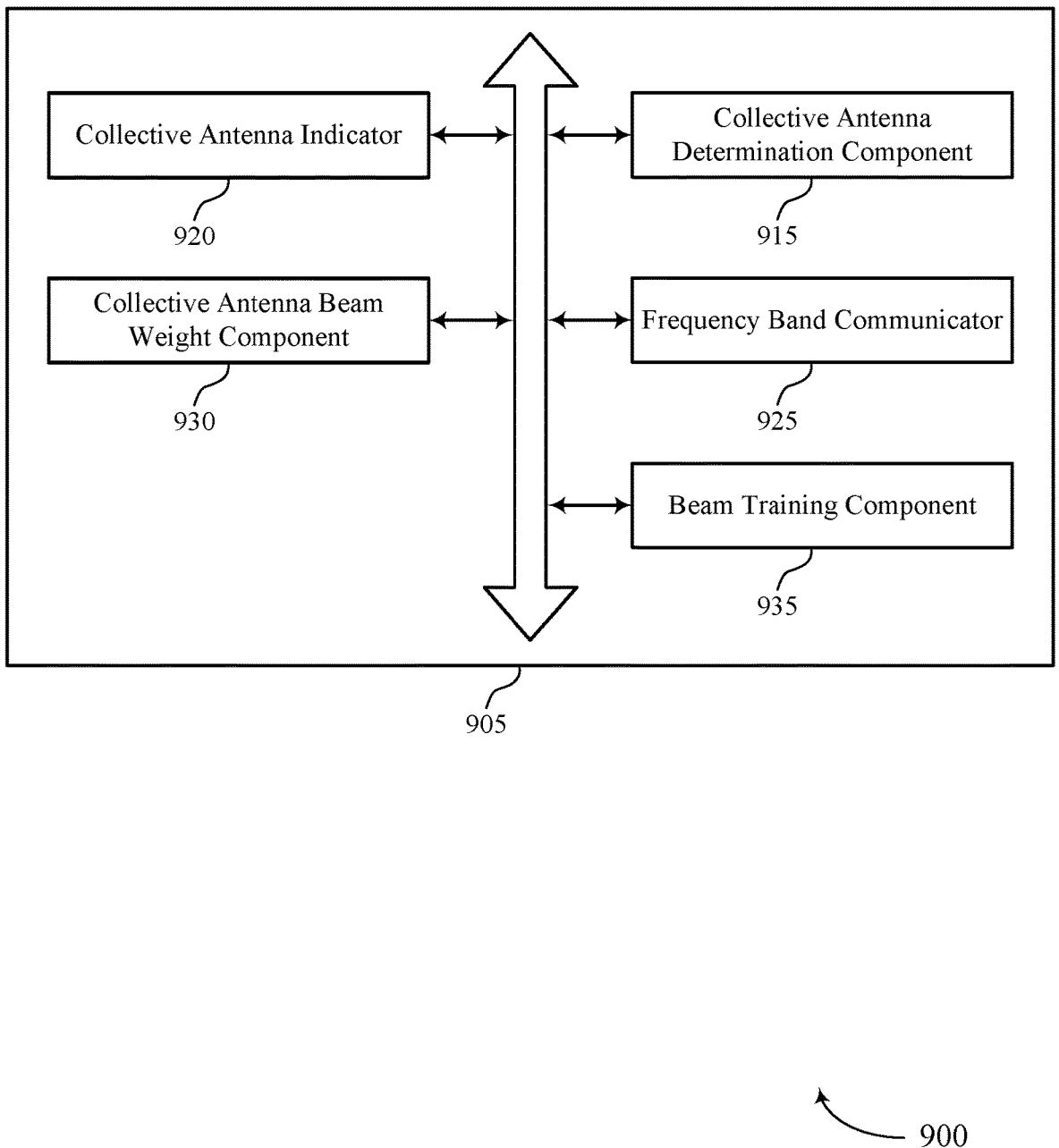
FIG. 9 shows a block diagram of a first wireless device communications manager that supports asymmetric uplink-downlink beam training in frequency bands in accordance with one or more aspects of the present disclosure.

FIG. 9 shows a block diagram 900 of a first wireless device communications manager 905 that supports asymmetric uplink-downlink beam training in frequency bands in accordance with one or more aspects of the present disclosure. The first wireless device communications manager 905 may be an example of aspects of a first wireless device communications manager 715, a first wireless device communications manager 815, or a first wireless device communications manager 1010 described herein. The first wireless device communications manager 905 may include a collective antenna determination component 915, a collective antenna indicator 920, a frequency band communicator 925, a collective antenna beam weight component 930, and a beam training component 935. Each of these modules may communicate, directly or indirectly, with one another (e.g., via one or more buses).

The collective antenna determination component 915 may adjust the collective antenna array based on the first set of antenna elements changing, the second set of antenna elements changing, or both and may transmit, to the second wireless device, an indication of the adjusted collective antenna array. In some cases, the collective antenna array may include a planar antenna array encompassing at least both the first set of antenna elements and the second set of antenna elements.

The collective antenna indicator 920 may transmit, to a second wireless device, an indication of a collective antenna array including at least a first set of antenna elements for downlink communications with the second wireless device and a second set of antenna elements for uplink communications with the second wireless device, the first set of antenna elements being different from the second set of antenna elements. In some cases, the first set of antenna elements may neither subsume the second set of antenna elements, nor the second set of antenna elements may subsume the first set of antenna elements. Additionally, the first wireless device may be a UE or a CPE in a wireless communications system, and the second wireless device may be a base station, a CPE, a relay device, a router, a repeater, or an IAB node in the wireless communications system.

The frequency band communicator 925 may communicate with the second wireless device based on the collective antenna array. In some examples, the frequency band communicator 925 may receive, from the second wireless device, an indication of a downlink receive beam based on the indication of the collective antenna array and may determine an uplink transmit beam to communicate with the second wireless device based on the indication of the downlink receive beam. In some cases, the downlink receive beam and the uplink transmit beam may be a beam correspondence pair, a QCL beam pair, or a combination thereof. Additionally, the mmW frequency band includes frequencies that are greater than 52.6 GHz.

The collective antenna beam weight component 930 may receive, from the second wireless device, a set of amplitude and phase beam weights for each antenna element in the collective antenna array. In some examples, the collective antenna beam weight component 930 may determine a first subset of beam weights for the first set of antenna elements and a second subset of beam weights for the second set of antenna elements, the first subset of beam weights and the second subset of beam weights being based on the set of beam weights for the collective antenna array.

The beam training component 935 may perform a beam training procedure for the collective antenna array. In some examples, the beam training component 935 may determine a first set of beam weights for the first set of antenna elements and a second set of beam weights for the second set of antenna elements based on the beam training procedure for the collective antenna array. In some examples, the beam training component 935 may receive, from the second wireless device, one or more aperiodic training signals for use with the collective antenna array as part of the beam training procedure. In some examples, the beam training component 935 may transmit, to the second wireless device, one or more measurement reports corresponding to the received aperiodic training signals. In some examples, the beam training component 935 may receive, from the second wireless device, an indication of a downlink receive beam based on the one or more measurement reports.

Additionally or alternatively, the beam training component 935 may identify a set of sets of antenna elements for the downlink communications with the second wireless device, where the second set of antenna elements includes the set of sets of antenna elements. Subsequently, the beam training component 935 may perform a beam training procedure for each set of antenna elements of the set of sets of antenna elements. In some examples, the beam training component 935 may receive, from the second wireless device, a first set of beam weights for the set of sets of antenna elements based on the beam training procedure and may generate a second set of beam weights for the second set of antenna elements based on the first set of beam weights. In some cases, the indication of the collective antenna array may be transmitted to the second wireless device as part of the beam training procedure. Additionally, the beam training procedure may be performed according to TDM. In some cases, the collective antenna array may include the second set of antenna elements. In some cases, each set of antenna elements of the set of sets of antenna elements may be used for the downlink communications with the second wireless device for different time symbols.

Figure 10:
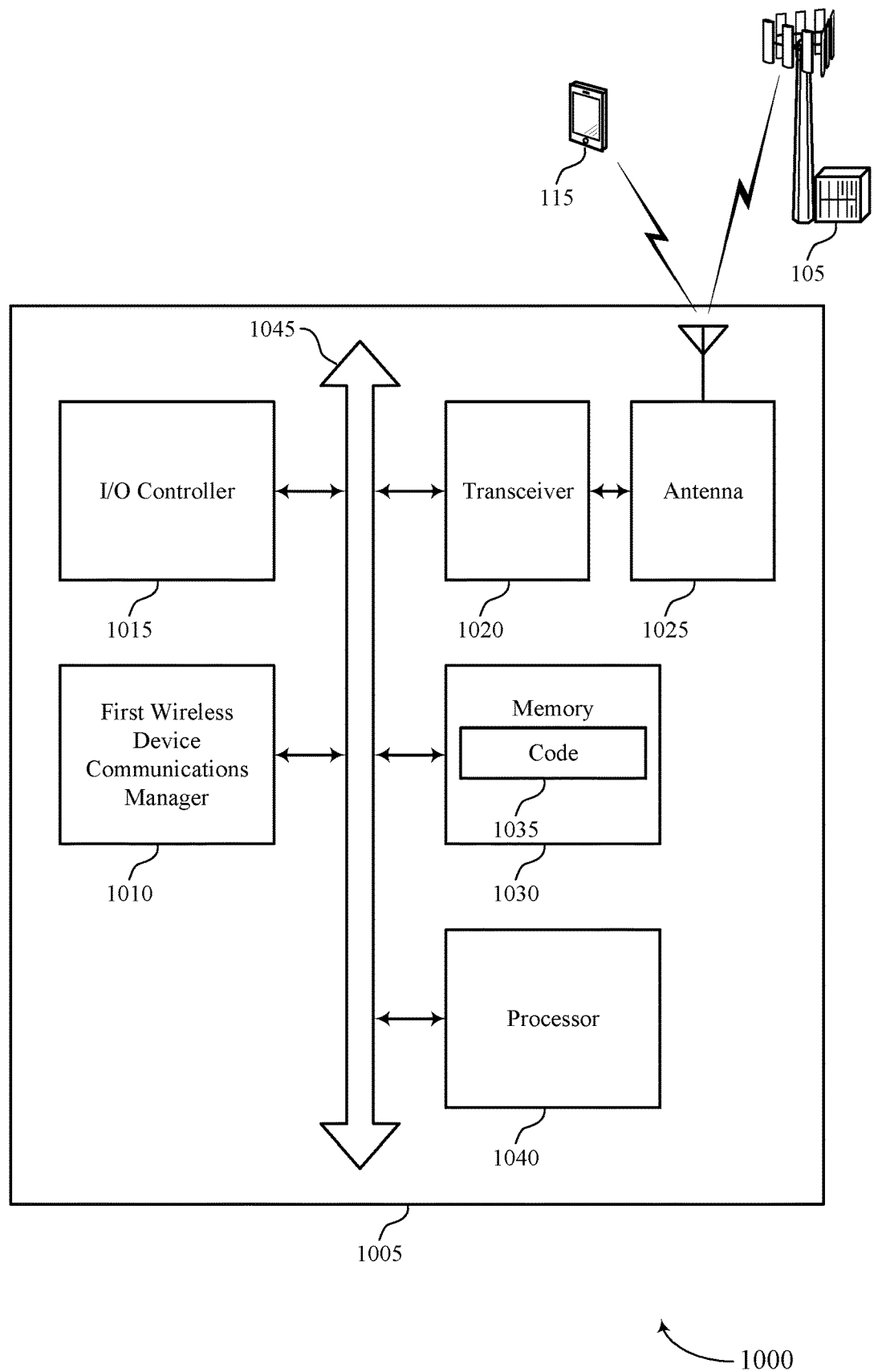
FIG. 10 shows a diagram of a system including a device that supports asymmetric uplink-downlink beam training in frequency bands in accordance with one or more aspects of the present disclosure.

FIG. 10 shows a diagram of a system 1000 including a device 1005 that supports asymmetric uplink-downlink beam training in frequency bands in accordance with one or more aspects of the present disclosure. The device 1005 may be an example of or include the components of device 705, device 805, or a first wireless device (e.g., a UE 115, a CPE, etc.) as described herein. The device 1005 may include components for bi-directional voice and data communications including components for transmitting and receiving communications, including a first wireless device communications manager 1010, an I/O controller 1015, a transceiver 1020, an antenna 1025, memory 1030, and a processor 1040. These components may be in electronic communication via one or more buses (e.g., bus 1045).

The first wireless device communications manager 1010 may transmit, to a second wireless device, an indication of a collective antenna array including at least a first set of antenna elements for downlink communications with the second wireless device and a second set of antenna elements for uplink communications with the second wireless device, the first set of antenna elements being different from the second set of antenna elements. The first wireless device communications manager 1010 may receive, from the second wireless device, a set of amplitude and phase beam weights for each antenna element in the collective antenna array. Additionally, the first wireless device communications manager 1010 may communicate with the second wireless device based on the collective antenna array.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting asymmetric uplink-downlink beam training in frequency bands).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
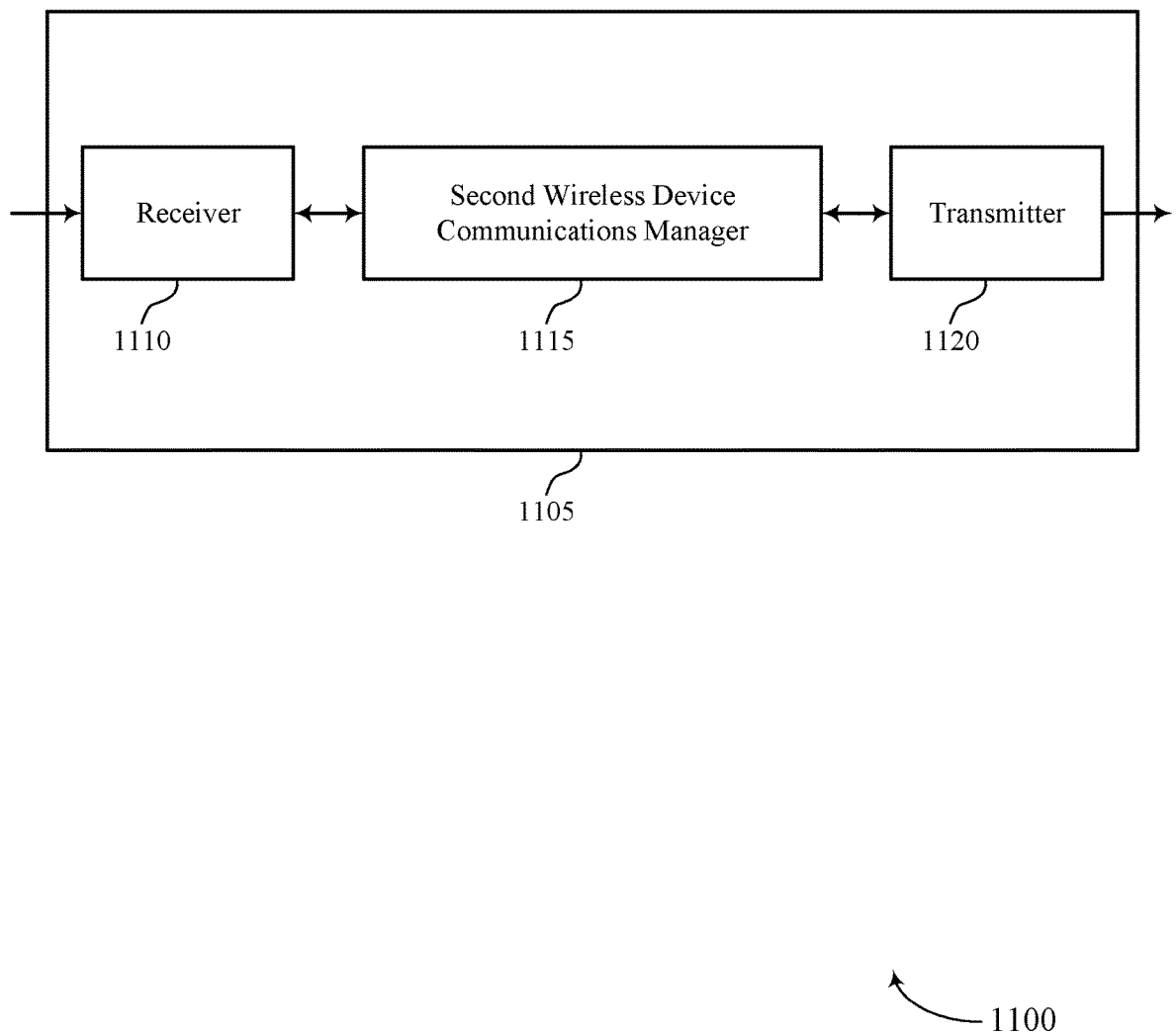
FIGS. 11 and 12 show block diagrams of devices that support asymmetric uplink-downlink beam training in frequency bands in accordance with one or more aspects of the present disclosure.

FIG. 11 shows a block diagram 1100 of a device 1105 that supports asymmetric uplink-downlink beam training in frequency bands in accordance with one or more aspects of the present disclosure. The device 1105 may be an example of aspects of a second wireless device (e.g., a base station 105, a CPE, a relay device, a router, a repeater, an IAB node, etc.) as described herein. The device 1105 may include a receiver 1110, a second wireless device communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to asymmetric uplink-downlink beam training in frequency bands, etc.). Information may be passed on to other components of the device 1105. The receiver 1110 may be an example of aspects of the transceiver 1420 described with reference to FIG. 14. The receiver 1110 may utilize a single antenna or a set of antennas.

The second wireless device communications manager 1115 may receive, from a first wireless device that is in communications with the second wireless device via a mmW frequency band, an indication of a collective antenna array for the communications with the first wireless device, the collective antenna array including a first set of antenna elements for downlink communications with a first wireless device and a second set of antenna elements for uplink communications with the first wireless device. In some cases, the second wireless device communications manager 1115 may communicate with the first wireless device on the first set of antenna elements and the second set of antenna elements based on a set of beam weights associated with a beam training procedure. The second wireless device communications manager 1115 may be an example of aspects of the second wireless device communications manager 1410 described herein.

The second wireless device communications manager 1115, or its sub-components, may be implemented in hardware, code (e.g., software or firmware) executed by a processor, or any combination thereof. If implemented in code executed by a processor, the functions of the second wireless device communications manager 1115, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The second wireless device communications manager 1115, or its sub-components, may be physically located at various positions, including being distributed such that portions of functions are implemented at different physical locations by one or more physical components. In some examples, the second wireless device communications manager 1115, or its sub-components, may be a separate and distinct component in accordance with various aspects of the present disclosure. In some examples, the second wireless device communications manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The first wireless device communications manager 1115 may be an example of means for performing various aspects of uplink-downlink beam training. The first wireless device communications manager 1115, or its sub-components, may be implemented in hardware (e.g., in communications management circuitry). The circuitry may include of processor, DSP, an ASIC, an FPGA or other programmable logic device, discrete gate or transistor logic, discrete hardware components, or any combination thereof designed to perform the functions described in the present disclosure.

In another implementation, the first wireless device communications manager 1115, or its sub-components, may be implemented in code (e.g., as communications management software or firmware) executed by a processor, or any combination thereof. If implemented in code executed by a processor, the functions of the first wireless device communications manager 1115, or its sub-components may be executed by a general-purpose processor, a DSP, an ASIC, an FPGA or other programmable logic device.

In some examples, the first wireless device communications manager 1115 may be configured to perform various operations (e.g., receiving, transmitting, communicating performing) using or otherwise in cooperation with the receiver 1110, the transmitter 1120, or both.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
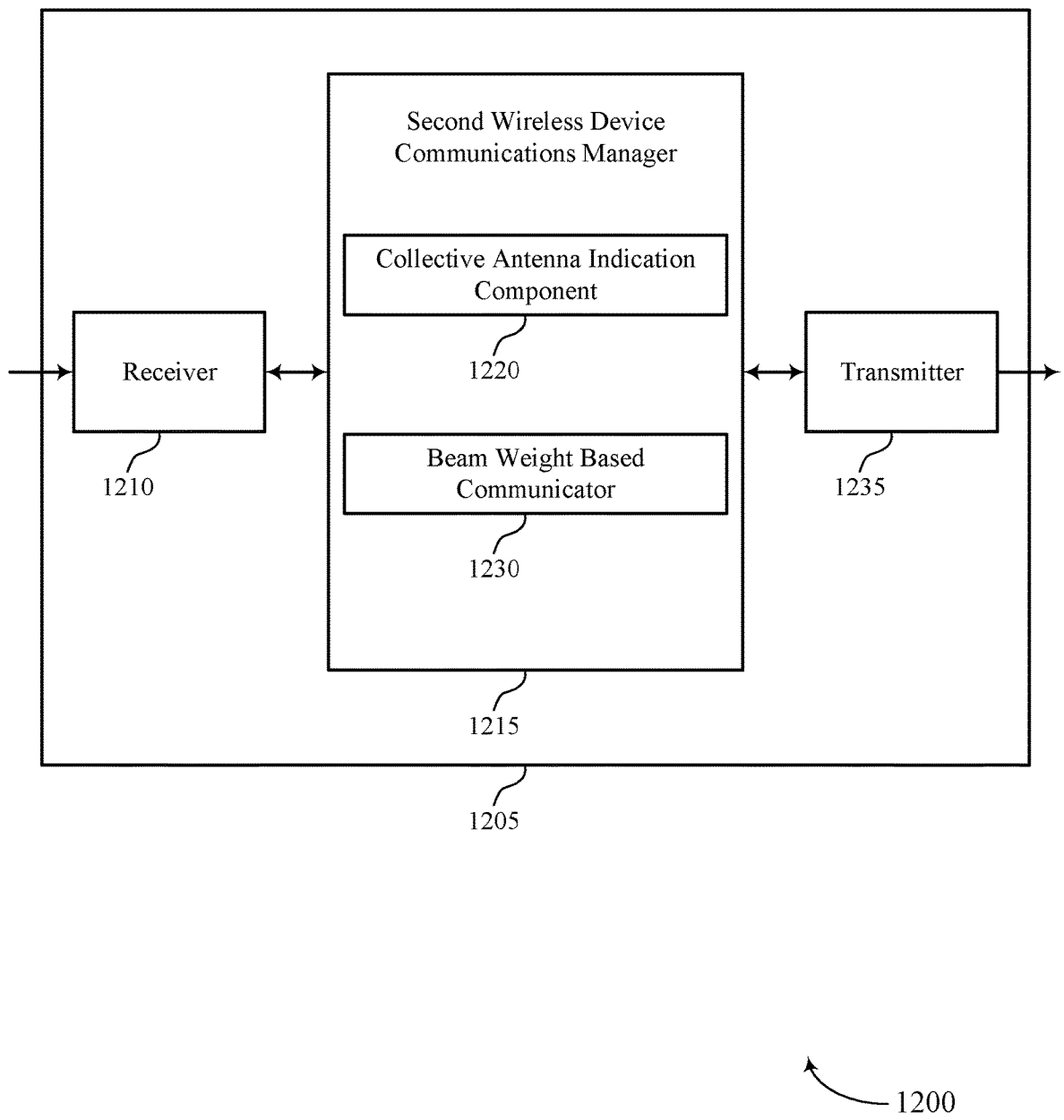

FIG. 12 shows a block diagram 1200 of a device 1205 that supports asymmetric uplink-downlink beam training in frequency bands in accordance with one or more aspects of the present disclosure. The device 1205 may be an example of aspects of a device 1105 or a second wireless device (e.g., a base station 105, a CPE, a relay device, a router, a repeater, an IAB node, etc.) as described herein. The device 1205 may include a receiver 1210, a second wireless device communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to asymmetric uplink-downlink beam training in frequency bands, etc.). Information may be passed on to other components of the device 1205. The receiver 1210 may be an example of aspects of the transceiver 1420 described with reference to FIG. 14. The receiver 1210 may utilize a single antenna or a set of antennas.

The second wireless device communications manager 1215 may be an example of aspects of the second wireless device communications manager 1115 as described herein. The second wireless device communications manager 1215 may include a collective antenna indication component 1220, and a beam weight based communicator 1230. The second wireless device communications manager 1215 may be an example of aspects of the second wireless device communications manager 1410 described herein.

The collective antenna indication component 1220 may receive, from a first wireless device that is in communications with the second wireless device via a mmW frequency band, an indication of a collective antenna array for the communications with the first wireless device, the collective antenna array including a first set of antenna elements for downlink communications with a first wireless device and a second set of antenna elements for uplink communications with the first wireless device.

The beam weight based communicator 1230 may communicate with the first wireless device on the first set of antenna elements and the second set of antenna elements based on a set of beam weights associated with a beam training procedure.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
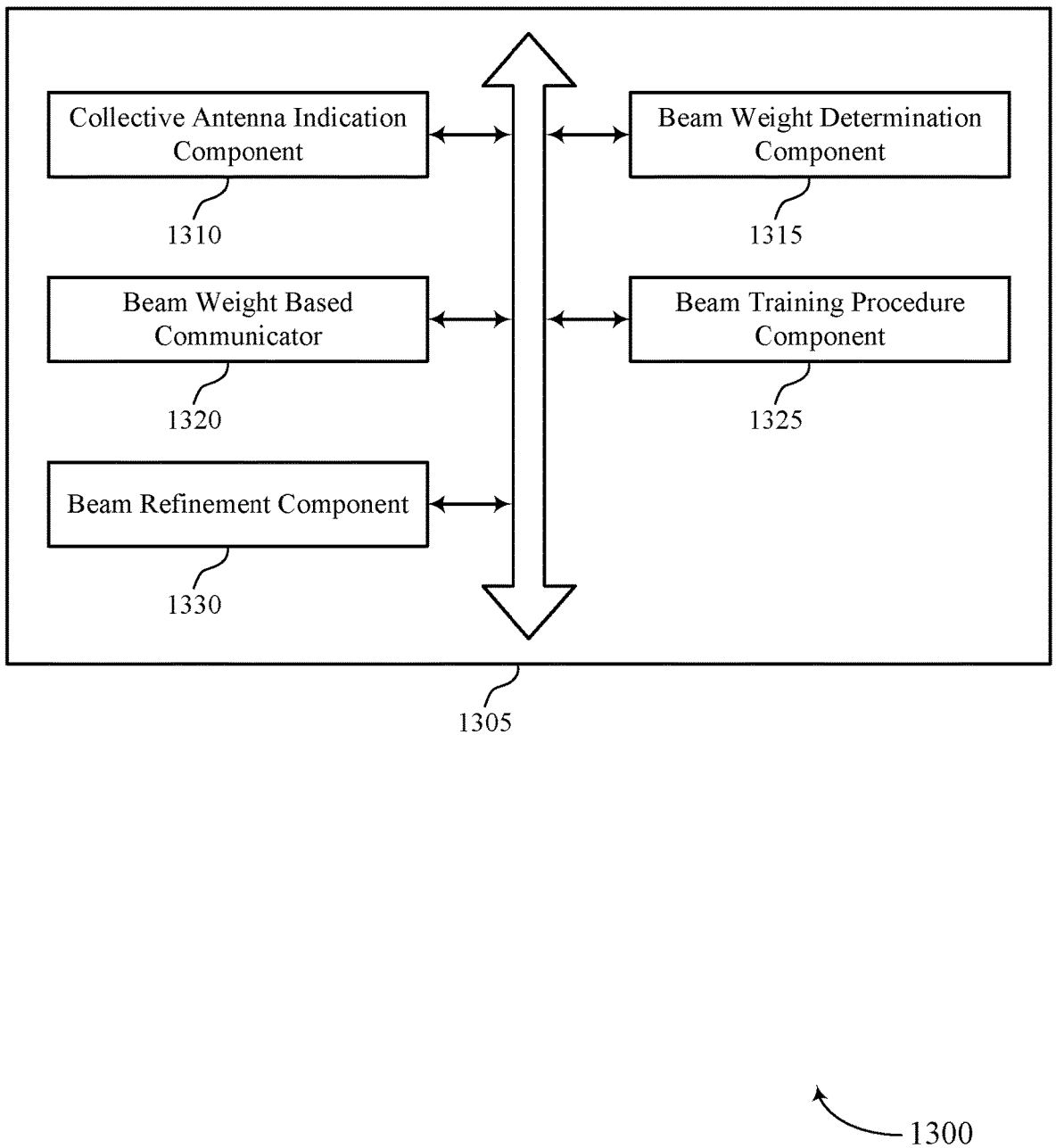
FIG. 13 shows a block diagram of a second wireless device communications manager that supports asymmetric uplink-downlink beam training in frequency bands in accordance with one or more aspects of the present disclosure.

FIG. 13 shows a block diagram 1300 of a second wireless device communications manager 1305 that supports asymmetric uplink-downlink beam training in frequency bands in accordance with one or more aspects of the present disclosure. The second wireless device communications manager 1305 may be an example of aspects of a second wireless device communications manager 1115, a second wireless device communications manager 1215, or a second wireless device communications manager 1410 described herein. The second wireless device communications manager 1305 may include a collective antenna indication component 1310, a beam weight determination component 1315, a beam weight based communicator 1320, a beam training procedure component 1325, and a beam refinement component 1330. Each of these modules may communicate, directly or indirectly, with one another (e.g., via one or more buses).

The collective antenna indication component 1310 may receive, from a first wireless device that is in communications with the second wireless device via a mmW frequency band, an indication of a collective antenna array for the communications with the first wireless device, the collective antenna array including a first set of antenna elements for downlink communications with a first wireless device and a second set of antenna elements for uplink communications with the first wireless device. In some cases, the collective antenna array may include a planar antenna array encompassing at least both the first set of antenna elements and the second set of antenna elements.

Additionally, the first set of antenna elements may neither subsume the second set of antenna elements, nor the second set of antenna elements may subsume the first set of antenna elements. In some cases, the mmW frequency band may include frequencies that are greater than 52.6 GHz. Additionally, the first wireless device may be a UE or a CPE in a wireless communications system, and the second wireless device may be a base station, a CPE, a relay device, a router, a repeater, or an IAB node in the wireless communications system.

The beam weight determination component 1315 may, in some examples, transmit, to the first wireless device, a set of amplitude and phase beam weights for each antenna element in the collective antenna array.

The beam weight based communicator 1320 may communicate with the first wireless device on the first set of antenna elements and the second set of antenna elements based on a set of beam weights associated with a beam training procedure.

The beam training procedure component 1325 may perform the beam training procedure for the collective antenna array. In some examples, the beam training procedure component 1325 may determine a downlink receive beam for the first set of antenna elements based on the beam training procedure for the collective antenna array and transmit, to the first wireless device, an indication of the downlink receive beam for the first wireless device to use for the downlink communications. In some examples, the beam training procedure component 1325 may determine one or more aperiodic training signals to transmit to the first wireless device as part of the beam training procedure, transmit, to the first wireless device, the one or more aperiodic training signals for use with the collective antenna array as part of the beam training procedure, and receive, to the second wireless device, one or more measurement reports corresponding to the transmitted aperiodic training signals, where the downlink receive beam is determined based on the one or more measurement reports.

In some examples, the beam refinement component 1330 may determine the first set of antenna elements, the second set of antenna elements, or both need a beam refinement and may perform a beam refinement procedure based on the determination. In some cases, the beam refinement procedure may include a beam training procedure.

Figure 14:
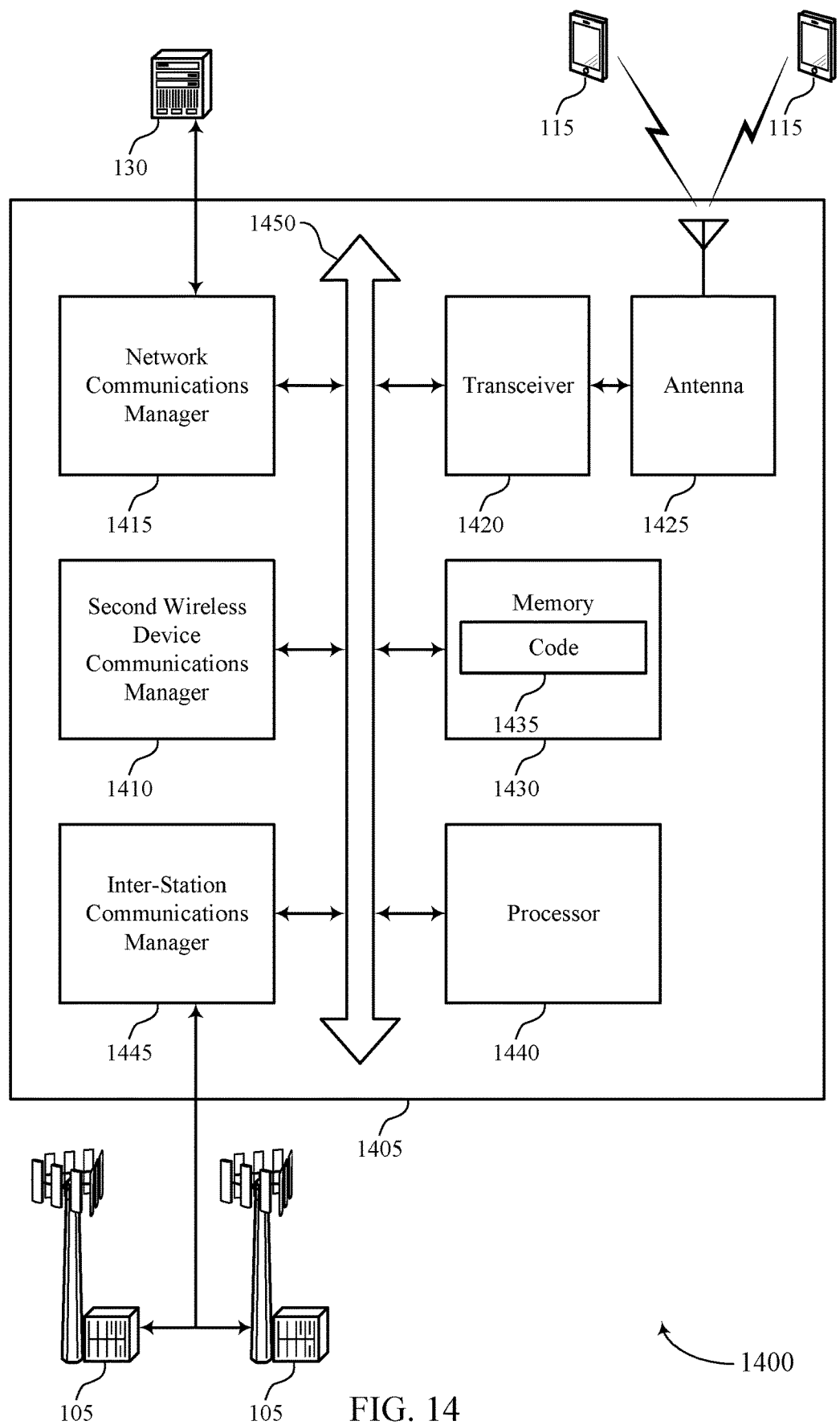
FIG. 14 shows a diagram of a system including a device that supports asymmetric uplink-downlink beam training in frequency bands in accordance with one or more aspects of the present disclosure.

FIG. 14 shows a diagram of a system 1400 including a device 1405 that supports asymmetric uplink-downlink beam training in frequency bands in accordance with one or more aspects of the present disclosure. The device 1405 may be an example of or include the components of device 1105, device 1205, or a second wireless device (e.g., a base station 105, a CPE, a relay device, a router, a repeater, an IAB node, etc.) as described herein. The device 1405 may include components for bi-directional voice and data communications including components for transmitting and receiving communications, including a second wireless device communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The second wireless device communications manager 1410 may receive, from a first wireless device that is in communications with the second wireless device via a mmW frequency band, an indication of a collective antenna array for the communications with the first wireless device, the collective antenna array including a first set of antenna elements for downlink communications with a first wireless device and a second set of antenna elements for uplink communications with the first wireless device. In some cases, the second wireless device communications manager 1410 may communicate with the first wireless device on the first set of antenna elements and the second set of antenna elements based on a set of beam weights associated with a beam training procedure.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting asymmetric uplink-downlink beam training in frequency bands).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
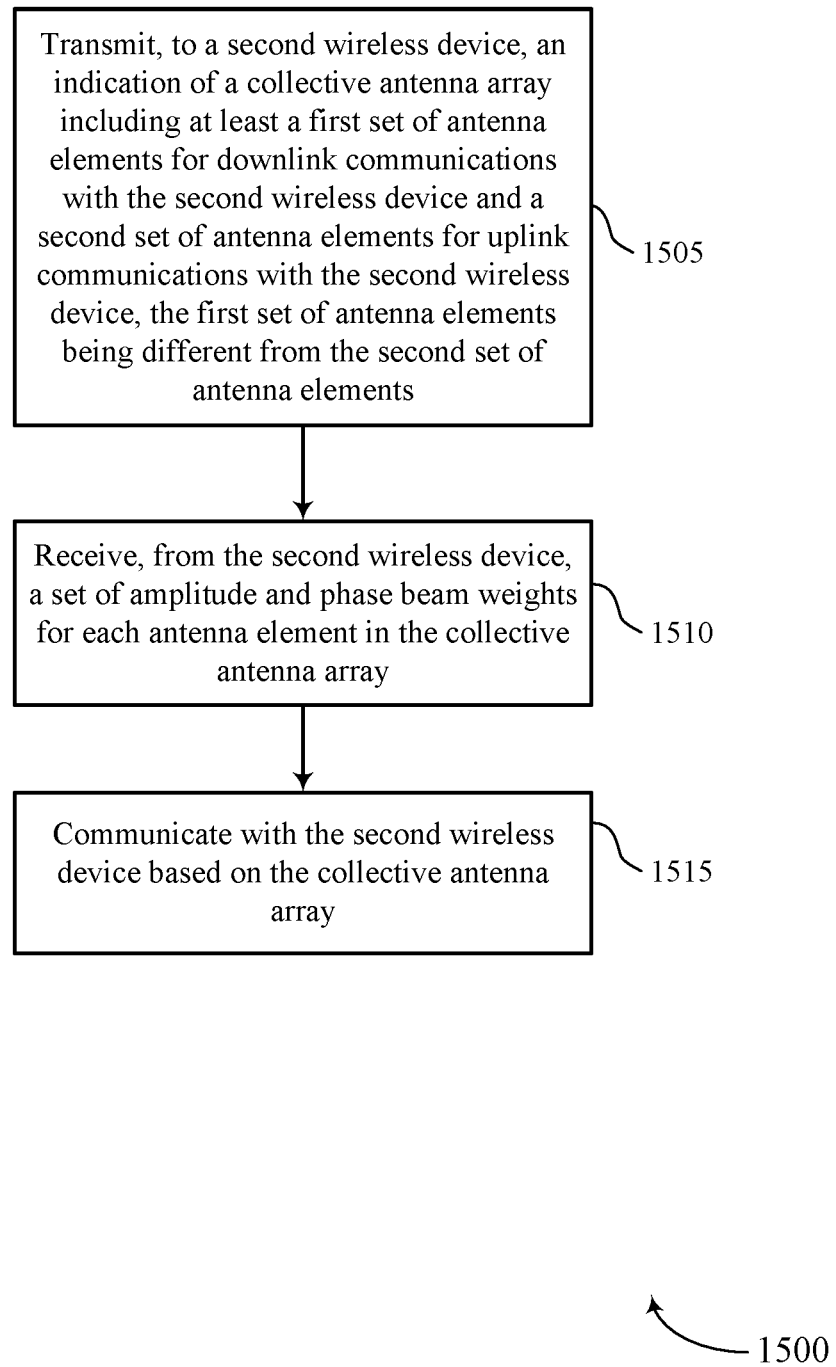
FIGS. 15 through 20 show flowcharts illustrating methods that support asymmetric uplink-downlink beam training in frequency bands in accordance with one or more aspects of the present disclosure.

FIG. 15 shows a flowchart illustrating a method 1500 that supports asymmetric uplink-downlink beam training in frequency bands in accordance with one or more aspects of the present disclosure. The operations of method 1500 may be implemented by a first wireless device (e.g., a UE 115, a CPE, etc.) or its components as described herein. For example, the operations of method 1500 may be performed by a first wireless device communications manager as described with reference to FIGS. 7 through 10. In some examples, a first wireless device may execute a set of instructions to control the functional elements of the first wireless device to perform the functions described herein.

Additionally or alternatively, a first wireless device may perform aspects of the functions described herein using special-purpose hardware.

At 1505, the first wireless device may transmit, to a second wireless device, an indication of a collective antenna array including at least a first set of antenna elements for downlink communications with a second wireless device and the second set of antenna elements for uplink communications with the second wireless device, the first set of antenna elements being different from the second set of antenna elements. The operations of 1505 may be performed according to the methods described herein. In some examples, aspects of the operations of 1505 may be performed by an antenna identifier as described with reference to FIGS. 7 through 10.

At 1510, the first wireless device may receive, from the second wireless device, a set of amplitude and phase beam weights for each antenna element in the collective antenna array. The operations of 1510 may be performed according to the methods described herein. In some examples, aspects of the operations of 1510 may be performed by a collective antenna determination component as described with reference to FIGS. 7 through 10.

At 1515, the first wireless device may communicate with the second wireless device based on the collective antenna array. The operations of 1515 may be performed according to the methods described herein. In some examples, aspects of the operations of 1515 may be performed by a frequency band communicator as described with reference to FIGS. 7 through 10.

Figure 16:
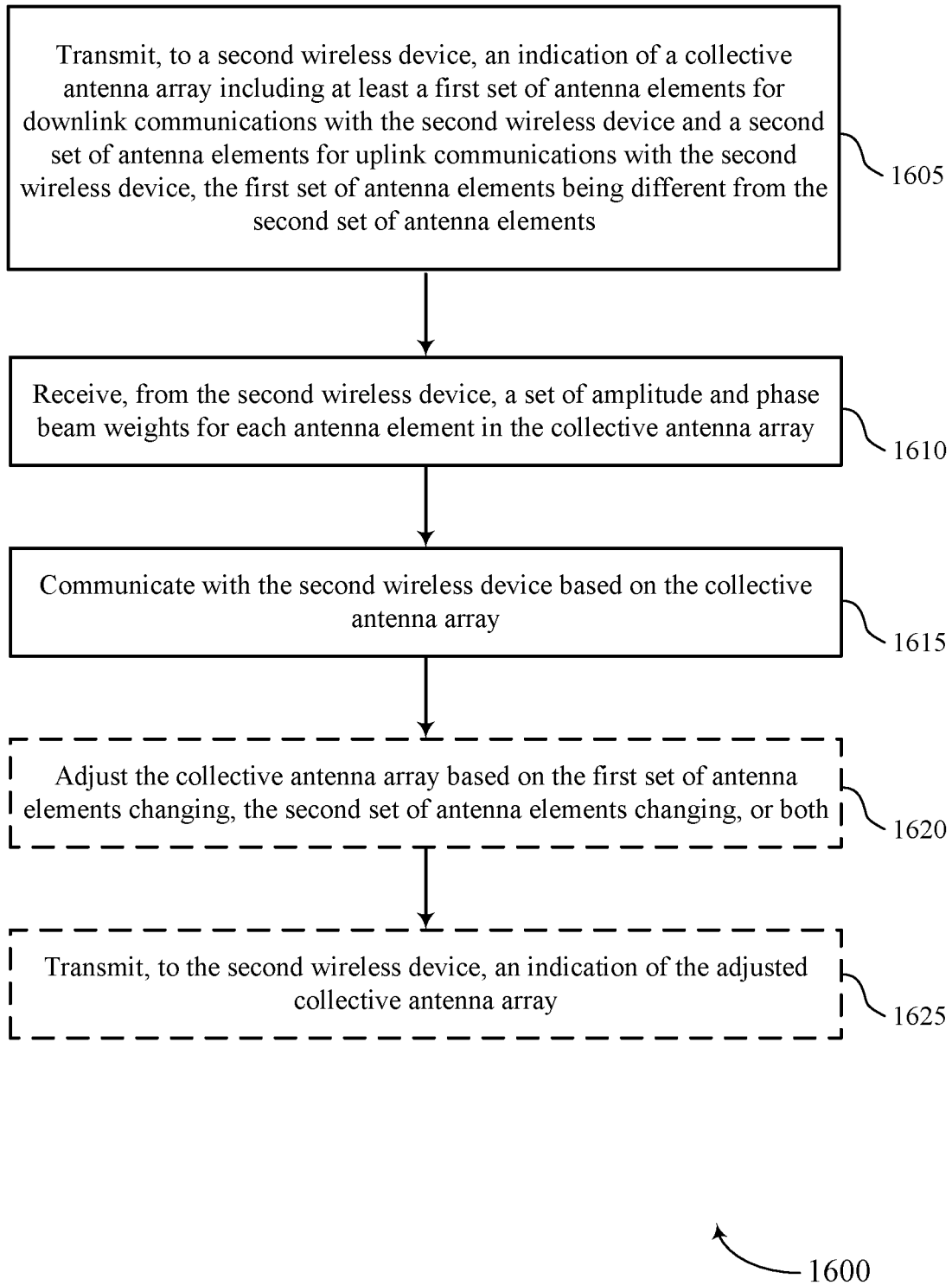

FIG. 16 shows a flowchart illustrating a method 1600 that supports asymmetric uplink-downlink beam training in frequency bands in accordance with one or more aspects of the present disclosure. The operations of method 1600 may be implemented by a first wireless device (e.g., a UE 115, a CPE, etc.) or its components as described herein. For example, the operations of method 1600 may be performed by a first wireless device communications manager as described with reference to FIGS. 7 through 10. In some examples, a first wireless device may execute a set of instructions to control the functional elements of the first wireless device to perform the functions described herein. Additionally or alternatively, a first wireless device may perform aspects of the functions described herein using special-purpose hardware.

At 1605, the first wireless device may transmit, to a second wireless device, an indication of a collective antenna array including at least a first set of antenna elements for downlink communications with the second wireless device and a second set of antenna elements for uplink communications with the second wireless device, the first set of antenna elements being different from the second set of antenna elements. The operations of 1605 may be performed according to the methods described herein. In some examples, aspects of the operations of 1605 may be performed by an antenna identifier as described with reference to FIGS. 7 through 10.

At 1610, the first wireless device may receive, from the second wireless device, a set of amplitude and phase beam weights for each antenna element in the collective antenna array. The operations of 1610 may be performed according to the methods described herein. In some examples, aspects of the operations of 1610 may be performed by a collective antenna determination component as described with reference to FIGS. 7 through 10.

At 1615, the first wireless device may communicate with the second wireless device based on the collective antenna array. The operations of 1615 may be performed according to the methods described herein. In some examples, aspects of the operations of 1615 may be performed by a collective antenna indicator as described with reference to FIGS. 7 through 10.

At 1620, the first wireless device may adjust the collective antenna array based on the first set of antenna elements changing, the second set of antenna elements changing, or both. The operations of 1620 may be performed according to the methods described herein. In some examples, aspects of the operations of 1620 may be performed by a collective antenna determination component as described with reference to FIGS. 7 through 10.

At 1625, the first wireless device may transmit, to the second wireless device, an indication of the adjusted collective antenna array. The operations of 1625 may be performed according to the methods described herein. In some examples, aspects of the operations of 1625 may be performed by a collective antenna determination component as described with reference to FIGS. 7 through 10.

Figure 17:
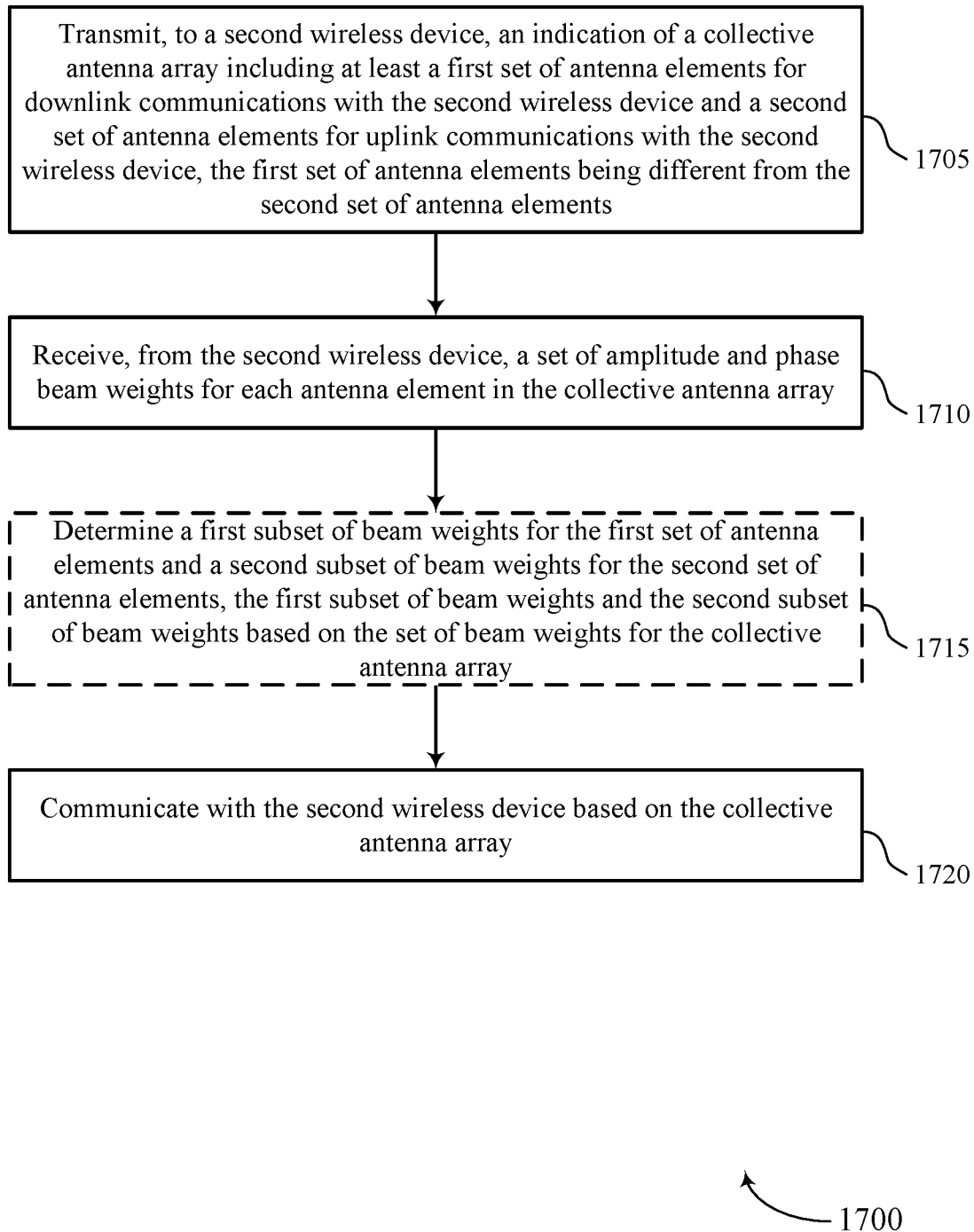

FIG. 17 shows a flowchart illustrating a method 1700 that supports asymmetric uplink-downlink beam training in frequency bands in accordance with one or more aspects of the present disclosure. The operations of method 1700 may be implemented by a first wireless device (e.g., a UE 115, a CPE, etc.) or its components as described herein. For example, the operations of method 1700 may be performed by a first wireless device communications manager as described with reference to FIGS. 7 through 10. In some examples, a first wireless device may execute a set of instructions to control the functional elements of the first wireless device to perform the functions described herein. Additionally or alternatively, a first wireless device may perform aspects of the functions described herein using special-purpose hardware.

At 1705, the first wireless device may transmit, to the second wireless device, an indication of the collective antenna array including at least a first set of antenna elements for downlink communications with the second wireless device and a second set of antenna elements for uplink communications with the second wireless device, the first set of antenna elements being different from the second set of antenna elements. The operations of 1705 may be performed according to the methods described herein. In some examples, aspects of the operations of 1705 may be performed by a collective antenna indicator as described with reference to FIGS. 7 through 10.

At 1720, the first wireless device may receive, from the second wireless device, a set of amplitude and phase beam weights for each antenna element in the collective antenna array. The operations of 1720 may be performed according to the methods described herein. In some examples, aspects of the operations of 1720 may be performed by a collective antenna beam weight component as described with reference to FIGS. 7 through 10.

At 1725, the first wireless device may determine a first subset of beam weights for the first set of antenna elements and a second subset of beam weights for the second set of antenna elements, the first subset of beam weights and the second subset of beam weights being based on the set of beam weights for the collective antenna array. The operations of 1725 may be performed according to the methods described herein. In some examples, aspects of the operations of 1725 may be performed by a collective antenna beam weight component as described with reference to FIGS. 7 through 10.

At 1730, the first wireless device may communicate with the second wireless device based on the collective antenna array. The operations of 1730 may be performed according to the methods described herein. In some examples, aspects of the operations of 1730 may be performed by a frequency band communicator as described with reference to FIGS. 7 through 10.

Figure 18:
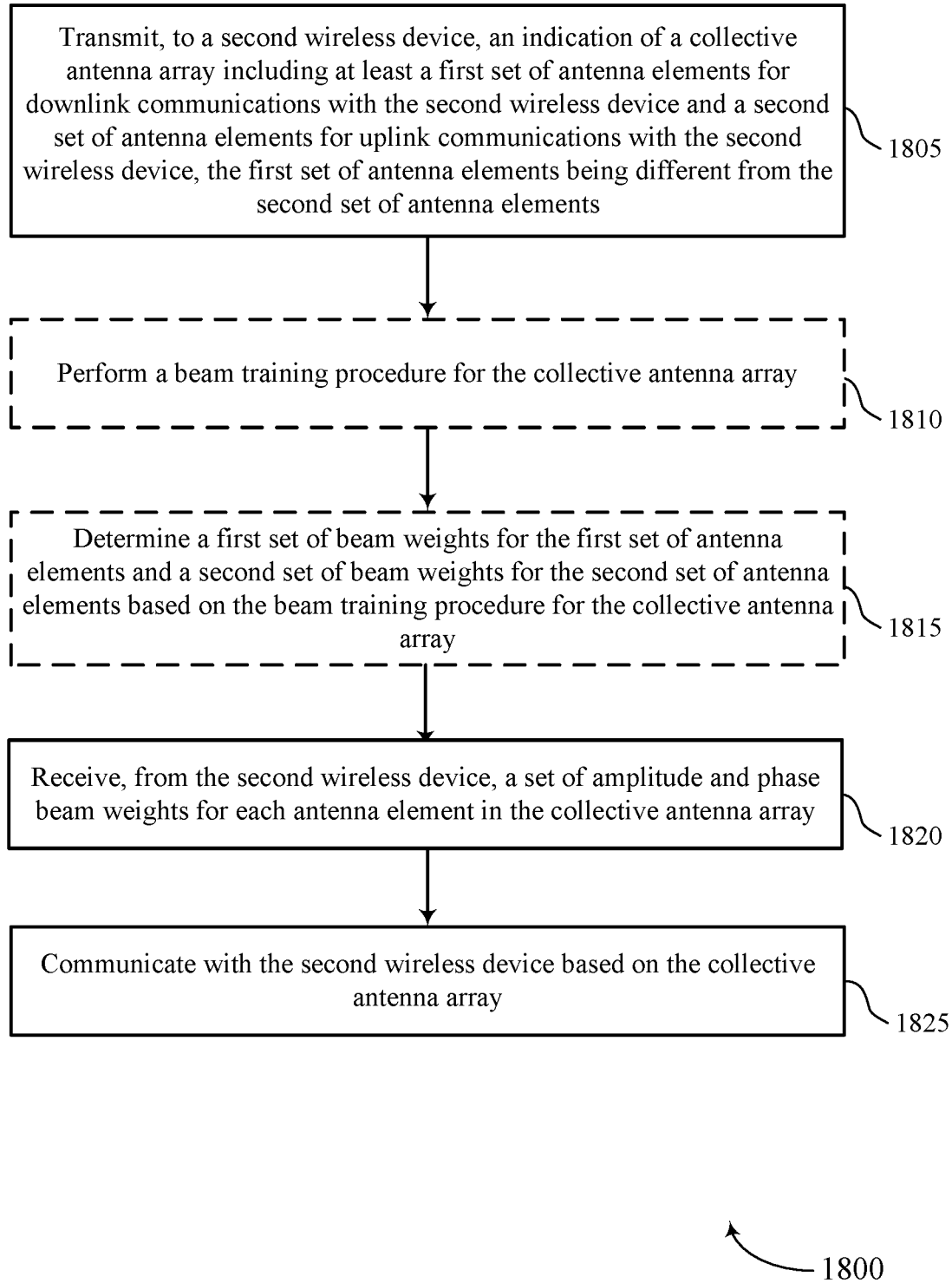

FIG. 18 shows a flowchart illustrating a method 1800 that supports asymmetric uplink-downlink beam training in frequency bands in accordance with one or more aspects of the present disclosure. The operations of method 1800 may be implemented by a first wireless device (e.g., a UE 115, a CPE, etc.) or its components as described herein. For example, the operations of method 1800 may be performed by a first wireless device communications manager as described with reference to FIGS. 7 through 10. In some examples, a first wireless device may execute a set of instructions to control the functional elements of the first wireless device to perform the functions described herein. Additionally or alternatively, a first wireless device may perform aspects of the functions described herein using special-purpose hardware.

At 1805, the first wireless device may transmit, to the second wireless device, an indication of the collective antenna array including at least a first set of antenna elements for downlink communications with the second wireless device and a second set of antenna elements for uplink communications with the second wireless device, the first set of antenna elements being different from the second set of antenna elements. The operations of 1805 may be performed according to the methods described herein. In some examples, aspects of the operations of 1805 may be performed by a collective antenna indicator as described with reference to FIGS. 7 through 10.

At 1810, in some examples, the first wireless device may perform a beam training procedure for the collective antenna array. The operations of 1810 may be performed according to the methods described herein. In some examples, aspects of the operations of 1810 may be performed by a beam training component as described with reference to FIGS. 7 through 10.

At 1815, in some examples, the first wireless device may determine a first set of beam weights for the first set of antenna elements and a second set of beam weights for the second set of antenna elements based on the beam training procedure for the collective antenna array. The operations of 1815 may be performed according to the methods described herein. In some examples, aspects of the operations of 1815 may be performed by a beam training component as described with reference to FIGS. 7 through 10.

At 1820, the first wireless device may receive, from the second wireless device, a set of amplitude and phase beam weights for each antenna element in the collective antenna array. The operations of 1820 may be performed according to the methods described herein. In some examples, aspects of the operations of 1820 may be performed by a collective antenna beam weight component as described with reference to FIGS. 7 through 10.

At 1825, the first wireless device may communicate with the second wireless device based on the collective antenna array. The operations of 1825 may be performed according to the methods described herein. In some examples, aspects of the operations of 1825 may be performed by a frequency band communicator as described with reference to FIGS. 7 through 10.

Figure 19:
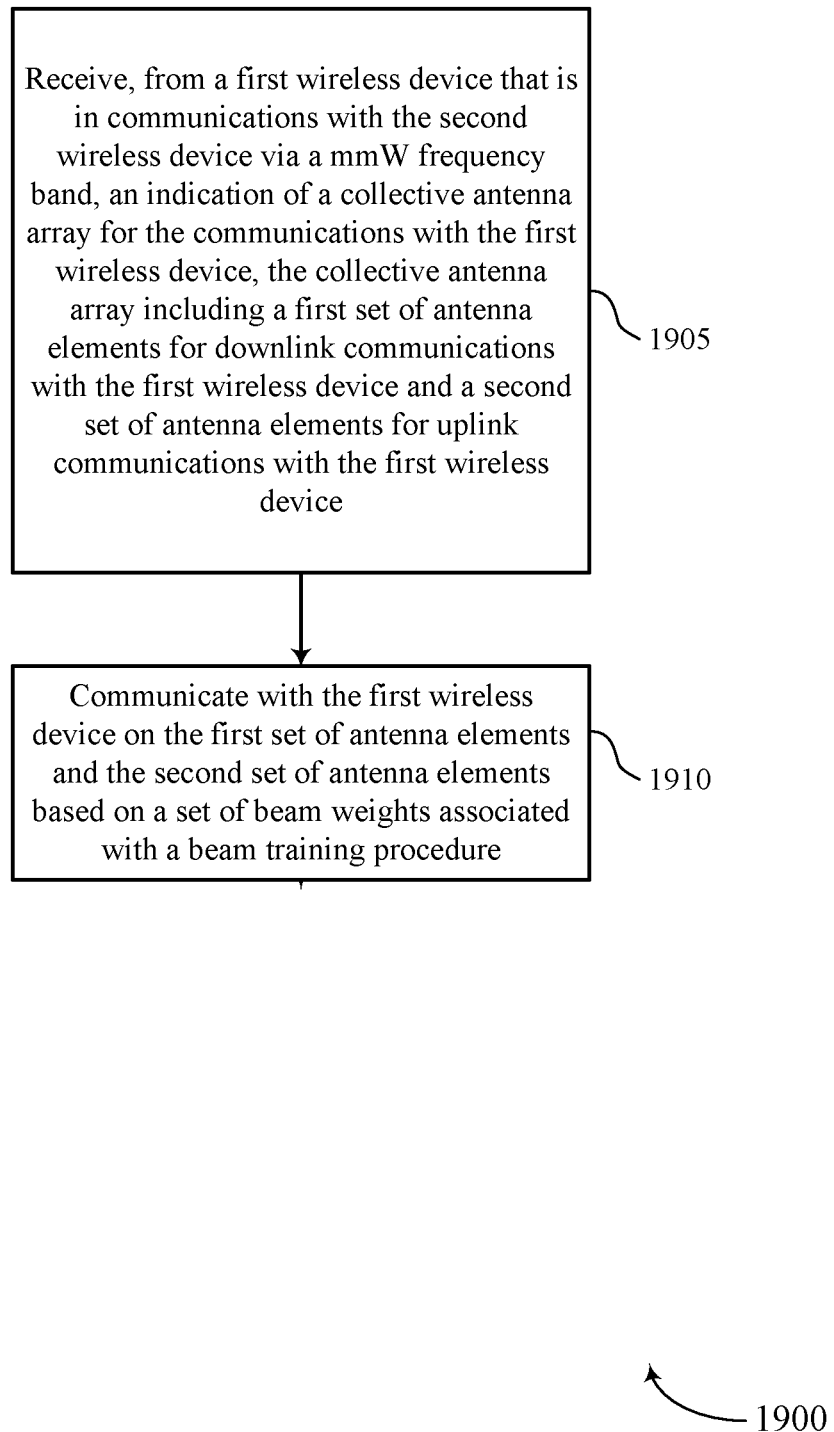

FIG. 19 shows a flowchart illustrating a method 1900 that supports asymmetric uplink-downlink beam training in frequency bands in accordance with one or more aspects of the present disclosure. The operations of method 1900 may be implemented by a second wireless device (e.g., a base station 105, a CPE, a relay device, a router, a repeater, an IAB node, etc.) or its components as described herein. For example, the operations of method 1900 may be performed by a second wireless device communications manager as described with reference to FIGS. 11 through 14. In some examples, a second wireless device may execute a set of instructions to control the functional elements of the second wireless device to perform the functions described herein. Additionally or alternatively, a second wireless device may perform aspects of the functions described herein using special-purpose hardware.

At 1905, the second wireless device may receive, from a first wireless device that is in communications with the second wireless device via a mmW frequency band, an indication of a collective antenna array for the communications with the first wireless device, the collective antenna array including a first set of antenna elements for downlink communications with a first wireless device and a second set of antenna elements for uplink communications with the first wireless device. The operations of 1905 may be performed according to the methods described herein. In some examples, aspects of the operations of 1905 may be performed by a collective antenna indication component as described with reference to FIGS. 11 through 14.

At 1910, the second wireless device may communicate with the first wireless device on the first set of antenna elements and the second set of antenna elements based on the determined set of beam weights. The operations of 1910 may be performed according to the methods described herein. In some examples, aspects of the operations of 1910 may be performed by a beam weight based communicator as described with reference to FIGS. 11 through 14.

Figure 20:
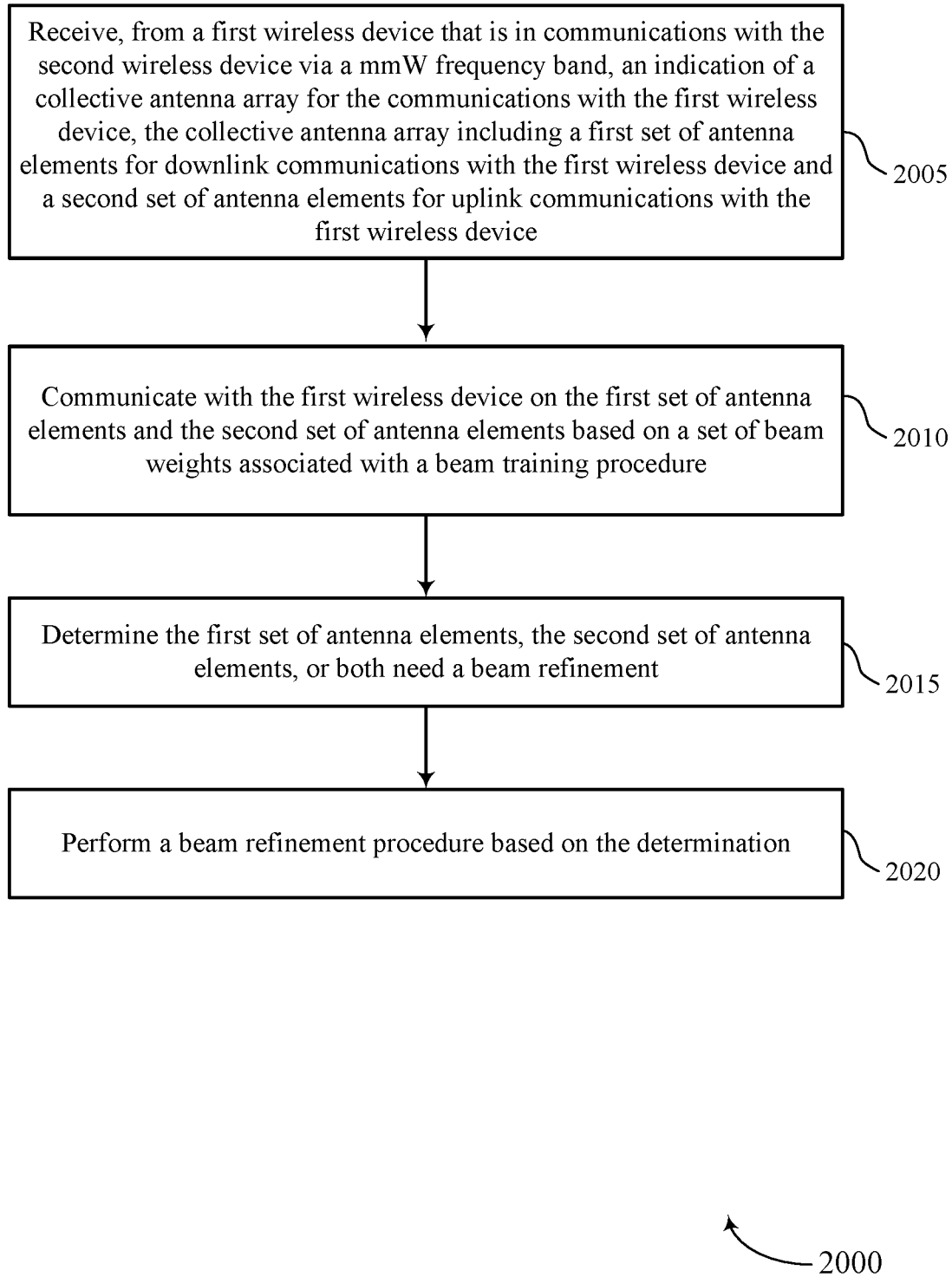

FIG. 20 shows a flowchart illustrating a method 2000 that supports asymmetric uplink-downlink beam training in frequency bands in accordance with one or more aspects of the present disclosure. The operations of method 2000 may be implemented by a second wireless device (e.g., a base station 105, a CPE, a relay device, a router, a repeater, an IAB node, etc.) or its components as described herein. For example, the operations of method 2000 may be performed by a second wireless device communications manager as described with reference to FIGS. 11 through 14. In some examples, a second wireless device may execute a set of instructions to control the functional elements of the second wireless device to perform the functions described herein. Additionally or alternatively, a second wireless device may perform aspects of the functions described herein using special-purpose hardware.

At 2005, the second wireless device may receive, from a first wireless device that is in communications with the second wireless device via a mmW frequency band, an indication of a collective antenna array for the communications with the first wireless device, the collective antenna array including a first set of antenna elements for downlink communications with a first wireless device and a second set of antenna elements for uplink communications with the first wireless device. The operations of 2005 may be performed according to the methods described herein. In some examples, aspects of the operations of 2005 may be performed by a collective antenna indication component as described with reference to FIGS. 11 through 14.

At 2010, the second wireless device may communicate with the first wireless device on the first set of antenna elements and the second set of antenna elements based on the determined set of beam weights. The operations of 2010 may be performed according to the methods described herein. In some examples, aspects of the operations of 2010 may be performed by a beam weight based communicator as described with reference to FIGS. 11 through 14.

At 2015, the second wireless device may determine the first set of antenna elements, the second set of antenna elements, or both need a beam refinement. The operations of 2015 may be performed according to the methods described herein. In some examples, aspects of the operations of 2015 may be performed by a beam refinement component as described with reference to FIGS. 11 through 14.

At 2020, the second wireless device may perform a beam refinement procedure based on the determination. The operations of 2020 may be performed according to the methods described herein. In some examples, aspects of the operations of 2020 may be performed by a beam refinement component as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

Aspect 1: A method for wireless communications at a first wireless device, including: transmitting, to a second wireless device, an indication of a collective antenna array including at least a first set of antenna elements for downlink communications with the second wireless device and a second set of antenna elements for uplink communications with the second wireless device, the first set of antenna elements being different from the second set of antenna elements; receiving, from the second wireless device, a set of amplitude and phase beam weights for each antenna element in the collective antenna array; and communicating with the second wireless device based at least in part on the collective antenna array.

Aspect 2: The method of aspect 1, further including: adjusting the collective antenna array based at least in part on the first set of antenna elements changing, the second set of antenna elements changing, or both; and transmitting, to the second wireless device, an indication of the adjusted collective antenna array.

Aspect 3: The method of any of aspects 1 or 2, further including: receiving, from the second wireless device, a set of amplitude and phase beam weights for each antenna element in the collective antenna array; and determining a first subset of beam weights for the first set of antenna elements and a second subset of beam weights for the second set of antenna elements, the first subset of beam weights and the second subset of beam weights being based at least in part on the set of beam weights for the collective antenna array.

Aspect 4: The method of any of aspects 1 to 3, further including: determining an uplink transmit beam to communicate with the second wireless device based at least in part on the indication of the downlink receive beam.

Aspect 5: The method of aspect 4, where the downlink receive beam and the uplink transmit beam include a beam correspondence pair, a quasi co location beam pair, or a combination thereof.

Aspect 6: The method of any of aspects 1 to 5, further including: performing a beam training procedure for the collective antenna array; and determining a first set of beam weights for the first set of antenna elements and a second set of beam weights for the second set of antenna elements based at least in part on the beam training procedure for the collective antenna array.

Aspect 7: The method of aspect 6, further including: receiving, from the second wireless device, one or more aperiodic training signals for use with the collective antenna array as part of the beam training procedure; transmitting, to the second wireless device, one or more measurement reports corresponding to the received aperiodic training signals; and receiving, from the second wireless device, an indication of a downlink receive beam based at least in part on the one or more measurement reports.

Aspect 8: The method of any of aspects 6 or 7, where the indication of the collective antenna array is transmitted to the second wireless device as part of the beam training procedure.

Aspect 9: The method of any of aspects 1 to 8, further including: identifying a plurality of sets of antenna elements for the downlink communications with the second wireless device, where the second set of antenna elements includes the plurality of sets of antenna elements; performing a beam training procedure for each set of antenna elements of the plurality of sets of antenna elements; receiving, from the second wireless device, a first set of beam weights for the plurality of sets of antenna elements based at least in part on the beam training procedure; and generating a second set of beam weights for the second set of antenna elements based at least in part on the first set of beam weights.

Aspect 10: The method of aspect 9, where the beam training procedure is performed according to time division multiplexing.

Aspect 11: The method of any of aspects 9 or 10, where the collective antenna array includes the second set of antenna elements.

Aspect 12: The method of any of aspects 9 to 11, where each set of antenna elements of the plurality of sets of antenna elements are used for the downlink communications with the second wireless device for different time symbols.

Aspect 13: The method of any of aspects 1 to 12, where the collective antenna array includes a planar antenna array encompassing at least both the first set of antenna elements and the second set of antenna elements.

Aspect 14: The method of any of aspects 1 to 13, where the first set of antenna elements neither subsumes the second set of antenna elements, nor the second set of antenna elements subsumes the first set of antenna elements.

Aspect 15: The method of any of examples 1 to 14, where the first wireless device is a UE or a CPE in a wireless communications system and the second wireless device is a base station, a CPE, a relay device, a router, a repeater, or an IAB node in the wireless communications system.

Aspect 16: The method of any of aspects 1 to 15, where the set of amplitude and phase beam weights includes a set of amplitude and phase shifter beam weights.

Aspect 17: An apparatus including at least one means for performing a method of any of aspects 1 to 15.

Aspect 18: An apparatus for wireless communications including a processor; memory coupled to the processor, the processor and memory configured to perform a method of any of aspects 1 to 15.

Aspect 19: A non-transitory computer-readable medium storing code for wireless communications, the code including instructions executable by a processor to perform a method of any of aspects 1 to 15.

Aspect 20: A method for wireless communications at a second wireless device, including: receiving, from a first wireless device that is in communications with the second wireless device via a millimeter wave frequency band, an indication of a collective antenna array for the communications with the first wireless device, the collective antenna array including a first set of antenna elements for downlink communications with a first wireless device and a second set of antenna elements for uplink communications with the first wireless device; and communicating with the first wireless device on the first set of antenna elements and the second set of antenna elements based at least in part on a set of beam weights associated with a beam training procedure.

Aspect 21: The method of aspect 20, further including: performing the beam training procedure for the collective antenna array; determining a downlink receive beam for the first set of antenna elements based at least in part on the beam training procedure for the collective antenna array; and transmitting, to the first wireless device, an indication of the downlink receive beam for the first wireless device to use for the downlink communications.

Aspect 22: The method of aspect 21, further including: determining one or more aperiodic training signals to transmit to the first wireless device as part of the beam training procedure; transmitting, to the first wireless device, the one or more aperiodic training signals for use with the collective antenna array as part of the beam training procedure; and receiving, to the second wireless device, one or more measurement reports corresponding to the transmitted aperiodic training signals, where the downlink receive beam is determined based at least in part on the one or more measurement reports.

Aspect 23: The method of any of aspects 20 to 22, further including: determining the first set of antenna elements, the second set of antenna elements, or both need a beam refinement; and performing a beam refinement procedure based at least in part on the determination.

Aspect 24: The method of any of aspects 20 to 23, further including: transmitting, to the first wireless device, a set of amplitude and phase beam weights for each antenna element in the collective antenna array.

Aspect 25: The method of aspect 24, where the beam refinement procedure includes a beam training procedure.

Aspect 26: The method of any of aspects 20 to 25, where the collective antenna array includes a planar antenna array encompassing at least both the first set of antenna elements and the second set of antenna elements.

Aspect 27: The method of any of aspects 20 to 26, where the first set of antenna elements neither subsumes the second set of antenna elements, nor the second set of antenna elements subsumes the first set of antenna elements.

Aspect 28: The method of any of aspects 20 to 27, where the millimeter wave frequency band includes frequencies that are greater than 52.6 GHz.

Aspect 29: The method of any of aspects 20 to 28, where the first wireless device is a UE or a CPE in a wireless communications system and the second wireless device is a base station, a CPE, a relay device, a router, a repeater, or an IAB node in the wireless communications system.

Aspect 30: An apparatus including at least one means for performing a method of any of aspects 20 to 29.

Aspect 31: An apparatus for wireless communications including a processor; memory coupled to the processor, the processor and memory configured to perform a method of any of aspects 20 to 29.

Aspect 32: A non-transitory computer-readable medium storing code for wireless communications, the code including instructions executable by a processor to perform a method of any of aspects 20 to 29.

What is claimed is:

1. A method for wireless communications at a first wireless device, comprising:
transmitting, to a second wireless device, an indication of a collective antenna array configuration determined by the first wireless device, the collective antenna array configuration comprising at least a first set of antenna elements for downlink communications with the second wireless device and the collective antenna array configuration further comprising at least a second set of antenna elements for uplink communications with the second wireless device, the first set of antenna elements being different from the second set of antenna elements;
receiving, from the second wireless device, a set of amplitude and phase beam weights comprising beam weights for each antenna element in the collective antenna array configuration; and
communicating with the second wireless device based at least in part on the collective antenna array configuration.

2. The method of claim 1, further comprising:
adjusting the collective antenna array configuration based at least in part on the first set of antenna elements changing, the second set of antenna elements changing, or both; and
transmitting, to the second wireless device, an indication of the adjusted collective antenna array configuration.

3. The method of claim 1, wherein the collective antenna array configuration comprises a planar antenna array encompassing at least both the first set of antenna elements and the second set of antenna elements.

4. The method of claim 1, wherein the first set of antenna elements does not subsume the second set of antenna elements and the second set of antenna elements does not subsume the first set of antenna elements.

5. The method of claim 1, further comprising:
determining a first subset of beam weights for the first set of antenna elements and a second subset of beam weights for the second set of antenna elements, the first subset of beam weights and the second subset of beam weights being based at least in part on the set of amplitude and phase beam weights for the collective antenna array configuration.

6. The method of claim 1, further comprising:
receiving, from the second wireless device, an indication of a downlink receive beam based at least in part on the indication of the collective antenna array configuration; and
determining an uplink transmit beam to communicate with the second wireless device based at least in part on the indication of the downlink receive beam.

7. The method of claim 6, wherein the downlink receive beam and the uplink transmit beam comprise a beam correspondence pair, a quasi co co-location beam pair, or a combination thereof.

8. The method of claim 1, further comprising:
performing a beam training procedure for the collective antenna array configuration; and
determining a first set of beam weights for the first set of antenna elements and a second set of beam weights for the second set of antenna elements based at least in part on the beam training procedure for the collective antenna array configuration.

9. The method of claim 8, further comprising:
receiving, from the second wireless device, one or more aperiodic training signals for use with the collective antenna array configuration as part of the beam training procedure;
transmitting, to the second wireless device, one or more measurement reports corresponding to the received one or more aperiodic training signals; and
receiving, from the second wireless device, an indication of a downlink receive beam based at least in part on the one or more measurement reports.

10. The method of claim 8, wherein the indication of the collective antenna array configuration is transmitted to the second wireless device as part of the beam training procedure.

11. The method of claim 1, further comprising:
identifying a plurality of sets of antenna elements for the downlink communications with the second wireless device, wherein the second set of antenna elements comprises the plurality of sets of antenna elements;
performing a beam training procedure for each set of antenna elements of the plurality of sets of antenna elements;
receiving, from the second wireless device, a first set of beam weights for the plurality of sets of antenna elements based at least in part on the beam training procedure; and
generating a second set of beam weights for the second set of antenna elements based at least in part on the first set of beam weights.

12. The method of claim 11, wherein the beam training procedure is performed according to time division multiplexing.

13. The method of claim 11, wherein the collective antenna array configuration comprises the second set of antenna elements.

14. The method of claim 11, wherein each set of antenna elements of the plurality of sets of antenna elements are used for the downlink communications with the second wireless device for different time symbols.

15. The method of claim 1, wherein the first wireless device is a user equipment (UE) or a customer premises equipment (CPE) in a wireless communications system and the second wireless device is a base station, a CPE, a relay device, a router, a repeater, or an integrated access and backhaul (IAB) node in the wireless communications system.

16. The method of claim 1, wherein the set of amplitude and phase beam weights comprises a set of amplitude and phase shifter beam weights.

17. A method for wireless communications at a second wireless device, comprising:
receiving, from a first wireless device that is in communications with the second wireless device via a millimeter wave frequency band, an indication of a collective antenna array configuration determined by the second wireless device for the communications with the first wireless device, the collective antenna array configuration comprising a first set of antenna elements for downlink communications with the first wireless device and the collective antenna array configuration further comprising a second set of antenna elements for uplink communications with the first wireless device; and
communicating with the first wireless device on the first set of antenna elements and the second set of antenna elements based at least in part on a set of beam weights associated with a beam training procedure.

18. The method of claim 17, wherein the collective antenna array configuration comprises a planar antenna array encompassing at least both the first set of antenna elements and the second set of antenna elements.

19. The method of claim 17, wherein the first set of antenna elements does not subsume the second set of antenna elements and the second set of antenna elements does not subsume the first set of antenna elements.

20. The method of claim 17, further comprising:
performing the beam training procedure for the collective antenna array configuration;
determining a downlink receive beam for the first set of antenna elements based at least in part on the beam training procedure for the collective antenna array configuration; and
transmitting, to the first wireless device, an indication of the downlink receive beam for the first wireless device to use for the downlink communications.

21. The method of claim 20, further comprising:
determining one or more aperiodic training signals to transmit to the first wireless device as part of the beam training procedure;
transmitting, to the first wireless device, the one or more aperiodic training signals for use with the collective antenna array configuration as part of the beam training procedure; and
receiving, from the first wireless device, one or more measurement reports corresponding to the transmitted one or more aperiodic training signals, wherein the downlink receive beam is determined based at least in part on the one or more measurement reports.

22. The method of claim 17, further comprising:
determining the first set of antenna elements, the second set of antenna elements, or both need a beam refinement; and
performing a beam refinement procedure based at least in part on the determination.

23. The method of claim 22, wherein the beam refinement procedure comprises the beam training procedure.

24. The method of claim 17, further comprising:
transmitting, to the first wireless device, a set of amplitude and phase beam weights for each antenna element in the collective antenna array configuration.

25. The method of claim 17, wherein the first wireless device is a user equipment (UE) or a customer premises equipment (CPE) in a wireless communications system and the second wireless device is a base station, a CPE, a relay device, a router, a repeater, or an integrated access and backhaul (IAB) node in the wireless communications system.

26. An apparatus for wireless communications at a first wireless device, comprising:
one or more memories; and
one or more processors coupled with the one or more memories and configured to cause the first wireless device to:
transmit, to a second wireless device, an indication of a collective antenna array configuration determined by the first wireless device, the collective antenna array configuration comprising at least a first set of antenna elements for downlink communications with the second wireless device and the collective antenna array configuration further comprising at least a second set of antenna elements for uplink communications with the second wireless device, wherein the first set of antenna elements is different from the second set of antenna elements;
receive, from the second wireless device, a set of amplitude and phase beam weights comprising beam weights for each antenna element in the collective antenna array configuration; and
communicate with the second wireless device based at least in part on the collective antenna array configuration.

27. The apparatus of claim 26, wherein the collective antenna array configuration comprises a planar antenna array configuration encompassing at least both the first set of antenna elements and the second set of antenna elements.

28. The apparatus of claim 26, wherein the first set of antenna elements does not subsume the second set of antenna elements and the second set of antenna elements does not subsume the first set of antenna elements.

29. An apparatus for wireless communications at a second wireless device, comprising:
one or more memories; and
one or more processors coupled with the one or more memories and configured to cause the second wireless device to:
receive, from a first wireless device that is in communications with the second wireless device via a millimeter wave frequency band, an indication of a collective antenna array configuration determined by the second wireless device for the communications with the first wireless device, the collective antenna array configuration comprising a first set of antenna elements for downlink communications with the first wireless device and the collective antenna array configuration further comprising a second set of antenna elements for uplink communications with the first wireless device; and
communicate with the first wireless device on the first set of antenna elements and the second set of antenna elements based at least in part on a set of beam weights associated with a beam training procedure.

30. The apparatus of claim 29, further comprising one or more of an antenna array, an antenna element, or an antenna subarray.

31. An apparatus for wireless communications at a first wireless device, comprising:
means for transmitting, to a second wireless device, an indication of a collective antenna array configuration determined by the first wireless device, the collective antenna array configuration comprising at least an indication of a first set of antenna elements for downlink communications with the second wireless device and the collective antenna array configuration further comprising at least an indication of a second set of antenna elements for uplink communications with the second wireless device, the first set of antenna elements being different from the second set of antenna elements;
means for receiving, from the second wireless device, a set of amplitude and phase beam weights comprising beam weights for each antenna element in the collective antenna array configuration; and
means for communicating with the second wireless device based at least in part on the collective antenna array configuration.

32. The apparatus of claim 31, wherein the collective antenna array configuration comprises a planar antenna array configuration encompassing at least both the first set of antenna elements and the second set of antenna elements.

33. The apparatus of claim 31, wherein the first set of antenna elements does not subsume the second set of antenna elements and the second set of antenna elements does not subsume the first set of antenna elements.

34. An apparatus for wireless communications at a second wireless device, comprising:
means for receiving, from a first wireless device that is in communications with the second wireless device via a millimeter wave frequency band, an indication of a collective antenna array configuration determined by the second wireless device for the communications with the first wireless device, the collective antenna array configuration comprising an indication of a first set of antenna elements for downlink communications with the first wireless device and the collective antenna array configuration further comprising an indication of a second set of antenna elements for uplink communications with the first wireless device; and
means for communicating with the first wireless device using the collective antenna array configuration based at least in part on a set of beam weights associated with a beam training procedure.

35. A non-transitory computer-readable medium storing code for wireless communications at a first wireless device, the code comprising instructions executable by one or more processors to cause the first wireless device to:
transmit, to a second wireless device, an indication of a collective antenna array configuration determined by the first wireless device, the collective antenna array configuration comprising at least a first set of antenna elements for downlink communications with the second wireless device and the collective antenna array configuration further comprising at least a second set of antenna elements for uplink communications with the second wireless device, the first set of antenna elements being different from the second set of antenna elements;
receive, from the second wireless device, a set of amplitude and phase beam weights comprising beam weights for each antenna element in the collective antenna array configuration; and
communicate with the second wireless device based at least in part on the collective antenna array configuration.

36. The non-transitory computer-readable medium of claim 35, wherein the collective antenna array configuration comprises a planar antenna array encompassing at least both the first set of antenna elements and the second set of antenna elements.

37. The non-transitory computer-readable medium of claim 35, wherein the first set of antenna elements does not subsume the second set of antenna elements and the second set of antenna elements does not subsume the first set of antenna elements.

38. A non-transitory computer-readable medium storing code for wireless communications at a second wireless device, the code comprising instructions executable by one or more processors to cause the second wireless device to:
receive, from a first wireless device that is in communications with the second wireless device via a millimeter wave frequency band, an indication of a collective antenna array configuration determined by the second wireless device for the communications with the first wireless device, the collective antenna array configuration comprising a first set of antenna elements for downlink communications with the first wireless device and the collective antenna array configuration further comprising a second set of antenna elements for uplink communications with the first wireless device; and
communicate with the first wireless device on the first set of antenna elements and the second set of antenna elements based at least in part on a set of beam weights associated with a beam training procedure.

39. A method for wireless communications at a first wireless device, comprising:
transmitting, to a second wireless device, an indication of a collective antenna array comprising at least a first set of antenna elements for downlink communications with the second wireless device and a second set of antenna elements for uplink communications with the second wireless device, the first set of antenna elements being different from the second set of antenna elements;

receiving, from the second wireless device, a set of amplitude and phase beam weights comprising beam weights for each antenna element in the collective antenna array; and communicating with the second wireless device based at least in part on the set of amplitude and phase beam weights of the collective antenna array.

40. The method of claim 39, further comprising:
adjusting the collective antenna array based at least in part on the first set of antenna elements changing, the second set of antenna elements changing, or both; and
transmitting, to the second wireless device, an indication of the adjusted collective antenna array.

41. The method of claim 39, wherein the collective antenna array comprises a planar antenna array encompassing at least both the first set of antenna elements and the second set of antenna elements, or wherein the first set of antenna elements neither subsumes the second set of antenna elements, nor the second set of antenna elements subsumes the first set of antenna elements.

42. The method of claim 39, further comprising:
determining a first subset of beam weights for the first set of antenna elements and a second subset of beam weights for the second set of antenna elements, the first subset of beam weights and the second subset of beam weights being based at least in part on the set of amplitude and phase beam weights for the collective antenna array, or further comprising:
receiving, from the second wireless device, an indication of a downlink receive beam based at least in part on the indication of the collective antenna array; and
determining an uplink transmit beam to communicate with the second wireless device based at least in part on the indication of the downlink receive beam.

43. The method of claim 39, further comprising:
identifying a plurality of sets of antenna elements for the downlink communications with the second wireless device, wherein the second set of antenna elements comprises the plurality of sets of antenna elements;
performing a beam training procedure for each set of antenna elements of the plurality of sets of antenna elements;
receiving, from the second wireless device, a first set of beam weights for the plurality of sets of antenna elements based at least in part on the beam training procedure; and
generating a second set of beam weights for the second set of antenna elements based at least in part on the first set of beam weights,
wherein at least one of the following applies:
the beam training procedure is performed according to time division multiplexing;
the collective antenna array comprises the second set of antenna elements; or
each set of antenna elements of the plurality of sets of antenna elements is used for the downlink communications with the second wireless device for different time symbols.

44. The method of claim 39, wherein the first wireless device is a user equipment (UE) or a customer premises equipment (CPE) in a wireless communications system and the second wireless device is a base station, a CPE, a relay device, a router, a repeater, or an integrated access and backhaul (IAB) node in the wireless communications system, or wherein the set of amplitude and phase beam weights comprises a set of amplitude and phase shifter beam weights.

45. A method for wireless communications at a second wireless device, comprising:
receiving, from a first wireless device that is in communications with the second wireless device via a millimeter wave frequency band, an indication of a collective antenna array for the communications with the first wireless device, the collective antenna array comprising a first set of antenna elements for downlink communications with the first wireless device and a second set of antenna elements for uplink communications with the first wireless device; and
communicating with the first wireless device on the first set of antenna elements and the second set of antenna elements based at least in part on a set of amplitude and phase beam weights comprising beam weights for each antenna element in the collective antenna array.

46. The method of claim 45, wherein the collective antenna array comprises a planar antenna array encompassing at least both the first set of antenna elements and the second set of antenna elements.

47. The method of claim 45, wherein the first set of antenna elements neither subsumes the second set of antenna elements, nor the second set of antenna elements subsumes the first set of antenna elements.

48. The method of claim 45, further comprising:
determining the first set of antenna elements, the second set of antenna elements, or both need a beam refinement; and
performing a beam refinement procedure based at least in part on the determining.

49. The method of claim 45, further comprising:
transmitting, to the first wireless device, the set of amplitude and phase beam weights.

50. The method of claim 45, wherein the first wireless device is a user equipment (UE) or a customer premises equipment (CPE) in a wireless communications system and the second wireless device is a base station, a CPE, a relay device, a router, a repeater, or an integrated access and backhaul (IAB) node in the wireless communications system.

* * * * *